US012130965B2

(12) United States Patent
Qiu et al.

(10) Patent No.: US 12,130,965 B2
(45) Date of Patent: Oct. 29, 2024

(54) RING ENABLING ITS WEARER TO ENTER CONTROL COMMANDS

(71) Applicant: Plume Design, Inc., Palo Alto, CA (US)

(72) Inventors: Zhicheng Qiu, Cupertino (CA); William J. McFarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 17/859,747

(22) Filed: Jul. 7, 2022

(65) Prior Publication Data

US 2024/0012479 A1   Jan. 11, 2024

(51) Int. Cl.
| | |
|---|---|
| *G06F 3/01* | (2006.01) |
| *G06F 1/16* | (2006.01) |
| *G06F 3/16* | (2006.01) |
| *G10L 15/06* | (2013.01) |
| *H04W 4/80* | (2018.01) |

(52) U.S. Cl.
CPC ............ *G06F 3/014* (2013.01); *G06F 1/163* (2013.01); *G06F 3/016* (2013.01); *G06F 3/017* (2013.01); *G06F 3/167* (2013.01); *G10L 15/063* (2013.01); *H04W 4/80* (2018.02)

(58) Field of Classification Search
CPC .......... G06F 3/017; G06F 3/014; G06F 21/31; G06F 3/0416; G06F 3/016; G06F 3/04883; G06F 1/1643; G06F 1/163; G06F 3/0233; G06F 3/167; G06F 3/0346; G06F 2203/0381; G10L 15/063; H04W 4/80
See application file for complete search history.

(56) References Cited

U.S. PATENT DOCUMENTS

| | | | |
|---|---|---|---|
| 6,853,197 B1 | 2/2005 | McFarland et al. | |
| 6,961,545 B2 | 11/2005 | Tehrani et al. | |
| 7,245,882 B1 | 7/2007 | McFarland | |
| 7,245,893 B1 | 7/2007 | Husted et al. | |
| 7,251,459 B2 | 7/2007 | McFarland et al. | |
| 9,104,271 B1* | 8/2015 | Adams | G06F 3/0233 |
| 9,136,937 B1 | 9/2015 | Cheng et al. | |
| 9,160,584 B1 | 10/2015 | Kavousian et al. | |
| 10,043,125 B2* | 8/2018 | Park | H04M 1/72412 |
| 10,520,378 B1* | 12/2019 | Brown | A61B 5/7267 |
| 10,528,780 B2* | 1/2020 | Lim | G06K 7/10722 |

(Continued)

*Primary Examiner* — William Lu
(74) *Attorney, Agent, or Firm* — Nicholas Martin; Greenberg Traurig, LLP

(57) ABSTRACT

Control systems and methods are provided that utilize a device, which can be worn by a user, to enable the user to enter control commands for causing a controller to control one or more electronic devices in a local network, such as a Wi-Fi system. A local control system, according to one implementation, includes a smart ring configured to obtain movement information related to one or more movements of the smart ring while a user is wearing the smart ring. The local control system also includes a controller device configured to communicate with the smart ring using Bluetooth or Wi-Fi signals. Characteristics of the movement information can be translated in order to obtain one or more control commands. The controller device is configured to control one or more aspects of one or more electronic devices based on the one or more control commands.

20 Claims, 10 Drawing Sheets

(56) References Cited

U.S. PATENT DOCUMENTS

| | | | |
|---|---|---|---|
| 10,855,335 B1* | 12/2020 | Napoles | H04B 5/06 |
| 11,188,160 B1* | 11/2021 | Liu | G06F 3/017 |
| 11,237,640 B2* | 2/2022 | Zhu | G06F 3/017 |
| 11,419,546 B2 | 8/2022 | Cihan et al. | |
| 12,045,392 B1* | 7/2024 | Salter | G06F 3/011 |
| 2002/0116185 A1* | 8/2002 | Cooper | G07C 1/00 |
| | | | 704/E15.045 |
| 2009/0096746 A1* | 4/2009 | Kruse | G06F 3/016 |
| | | | 340/407.1 |
| 2013/0090057 A1 | 4/2013 | Green et al. | |
| 2013/0127980 A1* | 5/2013 | Haddick | G06F 3/013 |
| | | | 348/14.08 |
| 2013/0278631 A1* | 10/2013 | Border | G06Q 30/02 |
| | | | 345/633 |
| 2013/0293424 A1 | 11/2013 | Zhu et al. | |
| 2014/0009344 A1 | 1/2014 | Zhu et al. | |
| 2014/0009355 A1 | 1/2014 | Samardzija et al. | |
| 2014/0105453 A1* | 4/2014 | Yang | G06V 40/28 |
| | | | 382/103 |
| 2014/0112511 A1 | 4/2014 | Corbin et al. | |
| 2014/0139454 A1* | 5/2014 | Mistry | G06F 3/017 |
| | | | 345/173 |
| 2014/0226572 A1 | 8/2014 | Thota et al. | |
| 2014/0340265 A1 | 11/2014 | Vazquez et al. | |
| 2015/0052430 A1* | 2/2015 | Dwan | G06F 3/04883 |
| | | | 715/702 |
| 2015/0065090 A1* | 3/2015 | Yeh | H04W 12/06 |
| | | | 455/563 |
| 2015/0099474 A1 | 4/2015 | Yarga et al. | |
| 2015/0109167 A1 | 4/2015 | Yarga et al. | |
| 2015/0195836 A1 | 7/2015 | Malkin et al. | |
| 2015/0220145 A1* | 8/2015 | Elangovan | G06F 3/011 |
| | | | 345/156 |
| 2015/0220922 A1* | 8/2015 | Elangovan | G06Q 20/40 |
| | | | 705/44 |
| 2015/0237665 A1* | 8/2015 | Aldriedge | H04W 4/80 |
| | | | 455/41.2 |
| 2015/0241983 A1* | 8/2015 | Elangovan | H04L 12/2807 |
| | | | 345/156 |
| 2015/0277559 A1* | 10/2015 | Vescovi | G06F 3/017 |
| | | | 345/173 |
| 2015/0302976 A1 | 10/2015 | Chang et al. | |
| 2015/0303568 A1 | 10/2015 | Yarga et al. | |
| 2015/0311960 A1 | 10/2015 | Samardzija et al. | |
| 2016/0041620 A1* | 2/2016 | Motoyama | G06F 3/012 |
| | | | 345/156 |
| 2016/0056526 A1 | 2/2016 | Li et al. | |
| 2016/0077581 A1* | 3/2016 | Shi | G06F 1/163 |
| | | | 340/12.5 |
| 2016/0077597 A1* | 3/2016 | Silawan | G06F 3/04883 |
| | | | 345/156 |
| 2016/0089751 A1* | 3/2016 | Batzler | B23K 9/1087 |
| | | | 434/234 |
| 2016/0246326 A1* | 8/2016 | von Badinski | H02S 99/00 |
| 2016/0336643 A1 | 11/2016 | Pascolini et al. | |
| 2017/0109990 A1* | 4/2017 | Xu | G08B 21/0446 |
| 2017/0131772 A1* | 5/2017 | Choi | G06F 3/017 |
| 2017/0177091 A1* | 6/2017 | Shah | G10H 1/348 |
| 2017/0207519 A1* | 7/2017 | Tzanidis | H01Q 1/38 |
| 2018/0120891 A1* | 5/2018 | Eim | H04M 1/0235 |
| 2019/0187813 A1* | 6/2019 | Choi | H03K 17/965 |
| 2020/0077954 A1 | 3/2020 | Bossetti et al. | |
| 2020/0077955 A1 | 3/2020 | Shui et al. | |
| 2020/0319768 A1* | 10/2020 | Drake | G04G 9/0064 |
| 2021/0029112 A1* | 1/2021 | Palle | G06F 21/32 |
| 2021/0089126 A1* | 3/2021 | Nickerson | G06V 40/1306 |
| 2022/0334639 A1* | 10/2022 | Sanchez | B60K 35/60 |
| 2022/0383741 A1* | 12/2022 | Sanchez | G06F 3/014 |

* cited by examiner

RING ENABLING ITS WEARER TO ENTER CONTROL COMMANDS

TECHNICAL FIELD

The present disclosure generally relates to networking systems and methods. More particularly, the present disclosure relates to a control system, which may include a user-wearable element, for controlling aspects of electrical devices within a local network.

BACKGROUND

Currently, "aging in place" systems may be installed in a home for enabling elderly and/or disabled individuals live their lives more independently. Some aging-in-place systems, for example, may include medical alert systems or Personal Emergency Response Systems (PERS) for notifying medical professionals in the event of a fall or other medical emergency. These systems typically include portable items (e.g., cell phones) and/or wearable items (e.g., bracelets, watches, pendants, necklaces, etc.) that can be easily accessed by the person who may be in urgent need of medical assistance. The portable or wearable items may communicate with a base unit, which may then be adapted to contact appropriate medical professionals using a landline telephone network, cellular network, or the like. In many systems, a monitoring center may employ operators who can respond to these emergency calls by notifying the appropriate emergency personnel (e.g., doctors, EMT, police officers, firefighters, etc.).

The portable or wearable items are usually activated by the wearer by pressing a specific button (e.g., "help" button, "medical emergency" button, "ambulance" button, "police" button, "fire" button, "contact family member" button, etc.). At times, however, an individual who has experienced a severe accident in a home may be limited in their ability to move and may not be able to reach these buttons. Therefore, there is a need for a notifying system that can be more easily triggered by such a wearer.

Also, some PERS devices include certain types of trigger devices (e.g., cell phones, emergency bracelet, pendant, etc.) that are not waterproof. Therefore, when taking a shower or bath, the individual may need place his or her cell phone in a safe place and/or remove other types of wearable devices. However, since one common type of accident involves slipping or falling in the bathroom, the individual may experience an accident and not have the emergency item with him or her, leaving the individual helpless in certain cases. Therefore, there is also a need in the field of medical alert systems to provide wearable emergency devices that can be worn at all times, even in the shower or bath.

Furthermore, since these wearable items only benefit the wearer when they are actually being worn and since the wearer would normally want to keep them items on his or her person at all times, there is also a need for manufacturers to manufacture these wearable medical items with certain design features and form factors that may be more comfortable for the wearer and which may be less obstructive to normal activities.

Also, if a person desires to wear such a device at all times, it would further be beneficial if such a device is able to do more than just notify authorities in the event of an emergency. Therefore, there is also a need for a wearable device that can be worn at practically all times which may additionally have extra features that can benefit the wearer in other non-urgent situations, such as for calling a friend, turning on lights, turning off a stove, etc.

BRIEF SUMMARY

The present disclosure describes systems and methods for using a smart device that can be worn by a user to input control instructions for controlling one or more electronic devices in a local network. A local control system, according to one implementation, may include a smart ring configured to obtain movement information related to one or more movements of the smart ring while a user is wearing the smart ring. In this implementations, the local control system further includes a controller device configured to communicate with the smart ring using Bluetooth or Wi-Fi signals. One or more electronic devices (e.g., lamps, kitchen stoves, garage doors, etc.) may be operating in the local control system. One or more characteristics of the movement information can be translated (interpreted) so as to obtain one or more control commands. The controller device is further configured to control one or more aspects of the one or more electronic devices based on the one or more control commands.

In some embodiments, the smart ring may include a processing device configured to translate the movement information so as to obtain the one or more control commands. The smart ring may include one or more accelerometers for three-dimensional detection of the one or more movements of the smart ring. The three-dimensional detection may include detection of speed, force, and direction of the one or more movements over time.

The controller device may include one or more of the mobile phone, an access point of a Wi-Fi network, a mesh pod, a Bluetooth hub, a relay device, a Wi-Fi gateway device, a modem, or other component of a Wi-Fi network. The controller device may communicate with the smart ring via one or more of the other components in the Wi-Fi network, based on the particular network layout. The smart ring may further include one or more of a vibration device and a beeper device configured to provide audio or tactile feedback to the user. The controller device may be a cloud-based controller.

The one or more electronic devices to be controlled may include a) lights, b) lamps, c) ceiling fans, d) garage doors, e) televisions, f) computers, g) mobile phones, h) stoves, i) ovens, j) microwaves, k) refrigerators, l) freezers, m) dishwashers, n) timers or clocks, o) HVAC systems, p) IoT devices, and/or other devices. The actions of controlling the one or more aspects of the one or more electronic devices may include a) turning on an electronic device, b) turning off an electronic device, c) changing a speed of an electronic device, d) changing a brightness level, e) changing a channel, f) dialing a phone number, g) changing a temperature level, and/or other suitable control actions based on the type of electronic device being controlled and the various corresponding aspects that can be controlled. In some embodiments, the above-described local control system (e.g., communications system 70) may further include one or more additional smart rings, which can be worn by the user on other fingers. In this respect, each smart ring 10 can be configured to obtain movement information and communicate the movement information or one or more control commands to the controller device.

BRIEF DESCRIPTION OF THE DRAWINGS

The present disclosure is illustrated and described herein with reference to the various drawings. Like reference

DETAILED DESCRIPTION

Figure 1A:
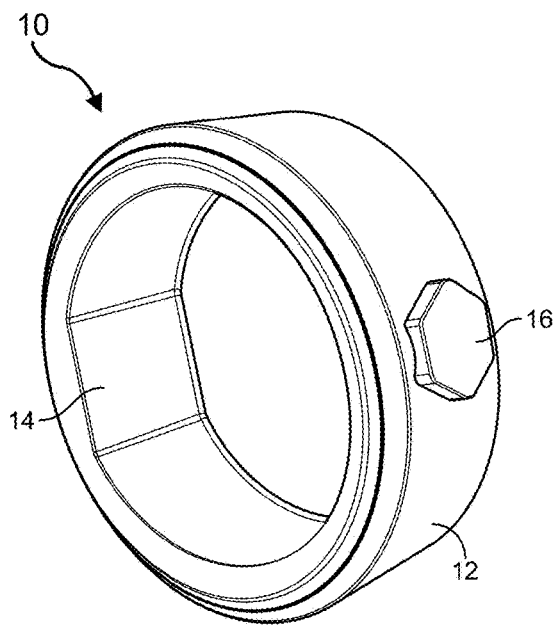
FIGS. 1A-1C are diagrams illustrating various perspective views of a smart ring for communicating user commands to a controller device, according to some embodiments of the present disclosure.

The present disclosure relates to systems and methods for overcoming the above-mentioned shortcomings of the conventional systems. Instead of bulky or awkward trigger devices for triggering an emergency call, the present disclosure provides embodiments in which triggering or activating device can be in the form of a ring (e.g., similar in size to a wedding band) that can be worn on a finger of an individual. Since many people may be accustomed to wearing rings, such a device typically would not get in the way of normal life activities.

Also, even with such a small form factor, the rings of the present disclosure are engineered to enable Bluetooth and Wi-Fi communication, as well as Near Field Communication (NFC) in some embodiments. Therefore, using a local network (e.g., Wi-Fi network in a residential setting), the ring may be configured to enable a wearer (e.g., user) to move his or her finger or hand in a sequence of recognizable motions. These motions can then be interpreted as commands for controlling certain electrical devices in the local network. For example, by moving the ring (e.g., on the user's hand) in a certain way, the user may be able to turn on (or turn off) lamps in a room, control the volume of speakers, turn on (or turn off) kitchen appliances, among many other uses.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Smart Ring

Figure 1B:
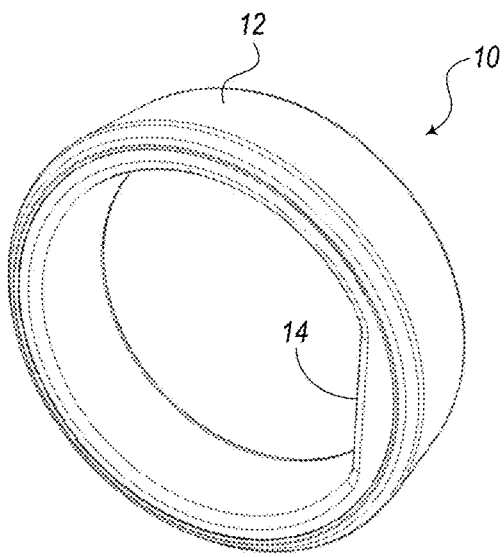
Figure 1C:
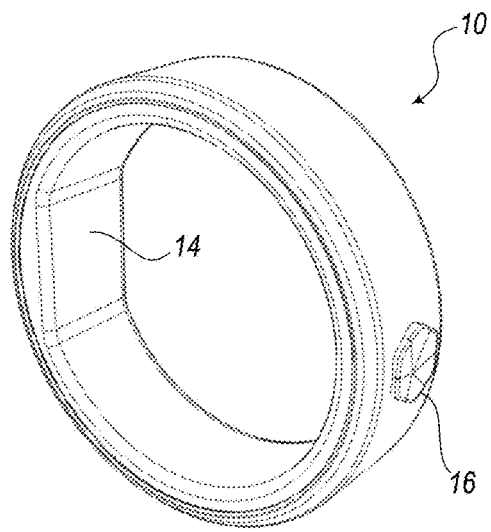

FIGS. 1A-1C are diagrams illustrating various perspective views of an embodiment of a smart ring 10 for communicating user commands to a controller device. As shown in FIG. 1, the smart ring 10 includes a band 12 that is configured to fit around a user's finger (or thumb). In this embodiment, the smart ring 10 may also include a width expanded portion 14, which fills in a portion of an inside curve of the band 12. The width expanded portion 14 may have a substantially planar surface facing the middle of the band 12. The width expanded portion 14 may be helpful for keeping the smart ring 10 in a set orientation around the user's finger, the significance of which may be understood from the description below. Also, the smart ring 10 may include a raised feature 16. In some embodiments, the raised feature 16 may simply be a decorative element or a logo. In other embodiments, however, the raised feature 16 may include functional elements, such as a camera, microphone, speaker, etc.

In some embodiments, the smart ring 10 may include a titanium finish, may be light weight and have a slim profile (e.g., less than 3.5 mm thick and 8 mm wide). Also, the smart ring 10 may be water resistant, have a one-week rechargeable battery, and may include any various size. In some embodiments, the smart ring 10 can include various sensors, such as a 14-bit Photoplethysmography (PPG) sensor, a three-axis accelerometer, etc. The smart ring 10 can be configured to measure vitals, such as heart rate, heart rate variability, sleep patterns, activity levels, falls, and the like.

The smart ring 10 may include one or more accelerometers (e.g., three-axis accelerometer) or other suitable devices for detecting movement and forces related to motion of the user's hand or finger on which the smart ring 10 is worn. Using these movement detecting devices, the smart ring 10 can interpret specific sequences or patterns of taps or other motions. For example, based on predetermined or customized movement patterns, the smart ring 10 may interpret these "hand signals" from the user as control commands or instructions. For example, the commands may include instructions for turning on or turning off certain electrical devices (e.g., lights, lamps, fans, televisions, kitchen appliances, ovens, stoves, etc.), controlling the volume or level of speakers, fans, analog devices, or other electrical devices having multiple or variable settings, dialing a phone number of a mobile phone, contacting emergency personnel, or other action.

Thus, by performing certain movement profiles, the smart ring 10 is configured to communicate control commands to a controller that is equipped to control one or more electronic devices in a local network. According to other embodiments, instead of a ring, the device worn by a user and used for entering control commands may be another type of wearable item, such as a bracelet, arm band, ankle band, etc.

Figure 2:
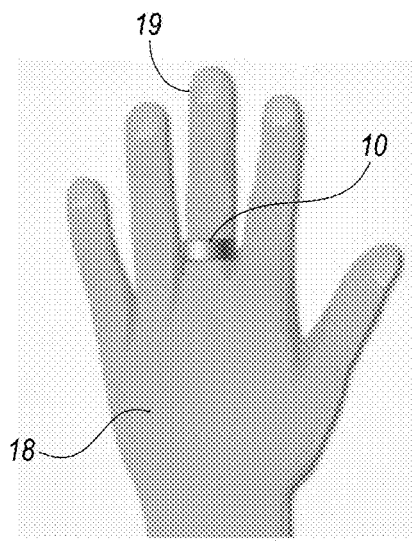
FIG. 2 is a diagram illustrating the smart ring of FIG. 1 being worn by a user, according to some embodiments.

FIG. 2 is a diagram illustrating the smart ring 10 of FIG. 1 being worn on a user's hand 18, such as on a finger 19. It may be noted that the smart ring 10 can be worn on any finger, thumb, or even toe of the user. In some cases, it may be beneficial to the user to wear the smart ring 10 on a finger that has good mobility (e.g., pointer finger, middle finger, etc.), thereby allowing the user to move the smart ring 10 in a controlled manner to more easily communicate motion information that can be properly interpreted.

The smart ring 10 may be configured to wirelessly communicate at short range to various devices, such as a control device incorporated in a local network (e.g., Wi-Fi network). The control device, in some embodiments, may be a stand-alone device, an access point device of a Wi-Fi system, a modem, a switch, a network node, a gateway device, a Bluetooth beacon device, a hub device, a mobile phone, etc. For example, when positioned near such a control device, the smart ring 10 and control device may be configured to operate within a first frequency band (e.g., Bluetooth frequencies) to enable communication therebetween. In response to receiving control commands and/or movement information from the smart ring 10, the control device may be configured to control one or more electrical devices in the local network or within a certain setting or periphery.

Figure 3:
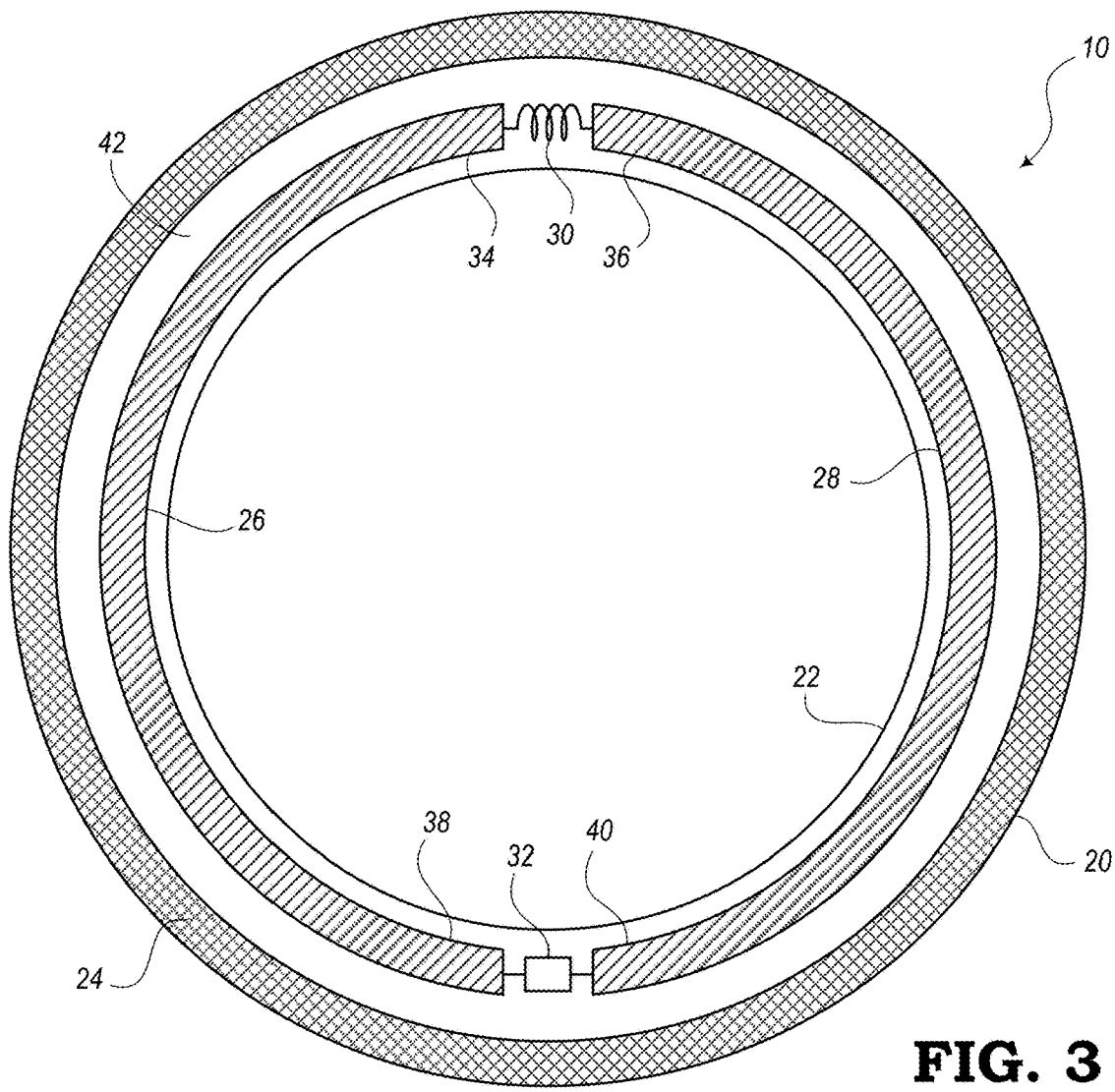
FIG. 3 is a diagram illustrating a cross-sectional view of the smart ring of FIG. 1 showing antennas and internal electrical circuitry of the smart ring, according to some embodiments.

FIG. 3 is a diagram illustrating a cross-sectional view of an embodiment of the smart ring 10 of FIG. 1. The smart ring 10 includes antennas and internal electrical circuitry for enabling communication with other components in a network. Also, as suggested above, the electrical circuitry of the smart ring 10 may include one or more accelerometers or other suitable movement detection devices for detecting the motion of the user's finger 19 or smart ring 10.

As illustrated in FIG. 3, the smart ring 10 includes an outer surface 20 that may usually be visible when it is worn on a user's finger 19 (not shown in FIG. 2) and an inner surface 22 that may usually be in contact with the user's finger 19. An outer portion of the smart ring 10 may include a metallic layer 24, which may include the outer surface 20 in some embodiments.

Also, the smart ring 10 includes a first antenna component 26 and a second antenna component 28. The first and second antenna components 26, 28, in combination, may form a ring or tube having a relatively narrow width (e.g., measured from an outer surface to an inner surface as shown in FIG. 2) and a relatively narrow depth (e.g., measured into the page). In some embodiments, the depth of each of the first and second antenna components 26, 28 may have a dimension that is greater than its width.

Furthermore, the smart ring 10 includes a first electrical circuit 30 and a second electrical circuit 32. The first electrical circuit 30 is configured to electrically connect a first end portion 34 of the first antenna component 26 with a first end portion 36 of the second antenna component 28. Also, the second electrical circuit 32 is configured to electrically connect a second end portion 38 of the first antenna component 26 with a second end portion 40 of the second antenna component 28.

Conventional smart rings normally do not allow operation within two separate frequency bands. However, according to the various embodiments of the present disclosure, various antenna components of the smart ring 10 include specific physical characteristics and electrical circuitry that enable operation at two different frequency band. This allows the smart ring 10 to pair with a mobile device to enable operation within the first frequency band (e.g., Bluetooth) while also allowing the smart ring 10 to pair with the POS machine 18 to enable operation within the second frequency band (e.g., NFC). In particular, antenna portions, as described below, may be configured to be fully embedded in a normal-sized ring. These antenna portions may include, for example, the electrically conductive battery casing and also a conductive trace or film on a Flexible Printed Circuit (FPC) or other suitable flexible board that can be embedded within the normal-sized ring. By using these components, which may already be needed for wireless communication, it may be possible to minimize the extra number of parts and circuitry to conserve space within the outer shell of the smart ring 10.

Figure 4:
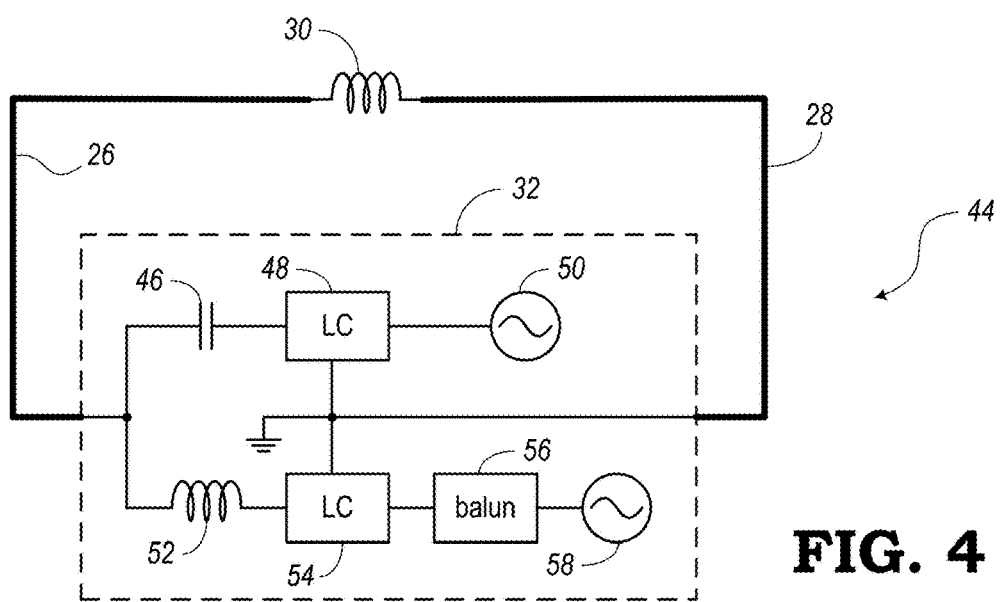
FIG. 4 is a schematic diagram illustrating the antennas and the electrical circuitry of the smart ring of FIG. 1 for communicating over one or more frequency bands, according to some embodiments.

FIG. 4 is a schematic diagram illustrating an embodiment of an antenna circuit 44 of the smart ring 10 for communicating over one or more frequency bands. The antenna circuit 44 includes the first electrical circuit 30, the second electrical circuit 32, and the first and second antenna components 26, 28 connected between the first and second electrical circuits 30, 32. According to some embodiments, the first electrical circuit 30 may simply include an inductor configured to act like an open circuit at higher frequencies (e.g., Bluetooth and Wi-Fi frequencies) and act like a short circuit at lower frequencies (e.g., NFC frequencies).

As shown in the embodiment of FIG. 4, the second electrical circuit 32 includes a first set of components 46, 48, 50 configured for operation at the higher frequency range (e.g., Bluetooth, Wi-Fi) and a second set of components 52, 54, 56, 58 configured for operation at the lower frequency range (e.g., NFC). The first set of components includes a frequency blocking device 46 (e.g., series-connected capacitor), a higher-frequency matching circuit 48 (e.g., a combination of series-connected and shunt-connected inductors and capacitors), and a higher-frequency radio transceiver 50. The second set of components includes a higher-frequency choke or choke inductor 52 (e.g., a series-connected inductor or ferrite bead), a lower-frequency matching circuit (e.g., combination of series-connected and shunt-connected capacitors), a lower-frequency balun 56, and a lower-frequency radio transceiver 58. The matching circuits 48, 54 may be connected to ground and the radio transceivers 50, 58 may also be connected to ground.

To design an efficient antenna according to antenna theory, the length of the antenna is typically one fourth, one half, or one whole wavelength of the frequency of operation. For example, at a Bluetooth or Wi-Fi frequency of about 2.4 GHz, the wavelength is about 120 mm. At an NFC frequency of about 13.56 MHz, the wavelength is about 22 m (i.e., 22,000 mm). Other similar wavelengths may be applicable at other Bluetooth or Wi-Fi frequencies (e.g., about 2.4000 GHz to about 2.4835 GHz) or at other NFC frequencies (e.g., about 12.66 MHz to about 14.46 MHz).

Rings typically vary in diameter from about 12 mm to about 22 mm and typically vary in internal circumference from about 49 mm to about 72 mm. Even the largest ring sizes are well below the typically minimum required diameter dimension of one-fourth of the wavelength (i.e., 120 mm/4=30 mm at Bluetooth frequency). Even if the entire ring is used for antenna volume it still would not be enough. This does not even include all the other parts, like battery, photo diode sensors, RF board, chips, etc.

Typical designs on the market use chip antennas that are a few mm by a few mm in size, but which require dedicated antenna volume that is already scarce. In addition, chip antennas have low performance as they typically rely on PCB ground currents that are weak in ring size (e.g., due to the small size of the PCB itself). Nevertheless, the configuration of the first and second antenna components 26, 28 as described with respect to the embodiments of the present disclosure allows the circumference dimension to be utilized in a specific way to enable operation in both frequency bands. Operation is contemplated in both frequency bands simultaneously. For example, the NFC band could be used for charging while the Bluetooth band is used for accessing another Bluetooth device, e.g., a phone, or Wi-Fi access point. Another example can include using the ring for payment (NFC) while maintaining a connection to a phone (Bluetooth).

In response to the first and second electrical circuits 30, 32 being configured in a first state, the first antenna component 26 and second antenna component 28 are configured to operate within a first frequency band (e.g., Bluetooth, Wi-Fi). In response to the first and second electrical circuits 30, 32 being configured in a second state, the first antenna component 26 and second antenna component 28 are configured to operate within a second frequency band (e.g., NFC). Also, in response to the first and second electrical circuits 30, 32 being configured in the first state, the first antenna component 26 and second antenna component 28 are configured in a dipole antenna arrangement (e.g., when the inductor 30 acts as an open circuit). In response to the first and second electrical circuits 30, 32 being configured in the second state, the first antenna component 26 and second antenna component 28 are configured in a loop antenna arrangement (e.g., when the inductor 30 acts as a short circuit).

According to some embodiments, operation within the first frequency band may enable pairing with a smart phone (or mobile device) and operation within the second frequency band enable pairing with a Point of Sale (POS) device. The antenna system may further include a battery configured to power one or more of the first and second electrical circuits 26, 28. The battery may include an outer metal casing that forms at least a portion of the first antenna component 26. The antenna system may also include a Near-Field Communication (NFC) charger. The NFC charger may be configured to create a magnetic field for charging the battery. The first frequency band may include one or more channels in a Bluetooth or Wi-Fi frequency band ranging from about 2.4000 GHz to about 2.4835 GHz and the second frequency band may include one or more channels in a Near-Field Communication (NFC) frequency band ranging from about 12.66 MHz to about 14.46 MHz.

The second antenna component 28 may include at least a Flexible Printed Circuit (FPC) or FPC board on which at least a portion of the second electrical circuit 28 resides. The first electrical circuit 30 may include a choke inductor that behaves like an open circuit when operating within the first frequency band and behaves like a short circuit when operating within the second frequency band. The second electrical circuit 32 may include blocking elements 46, 52, matching circuit elements 48, 54, and transceiver elements 50, 58 to enable operation within either the first frequency band or second frequency band. Also, according to embodiments described with respect to FIGS. 15 and 16, the antenna system may further include one or more conductive strips and/or one or more ferrite strips attached to one or more of the first and second antenna components 26, 28.

In operation, the smart ring 10 uses the metal jacket or casing on the battery as part of the first antenna component 26 and can therefore serve as one of the arms of a dipole-like antenna, radiator, or transceiver. When the first electrical circuit 30 is shorted, the battery casing can serve as part of a current path for a loop antenna including both antenna components 26, 28. The battery can also serve as the ground plane of the antenna. In some embodiments, a thin metallic film (e.g., copper tape) can be installed along an outside surface of the battery (e.g., as described below with respect to FIGS. 15 and 16).

The antenna may include, at least partially, one or more traces on the FPC board or PCB (i.e., flexible or rigid boards). Other parts of the antenna may include, at least partially, the metallization on the outside of the battery (e.g., battery case). A ground plane of the FPC may be the actual radiating element of the antenna, (e.g., no separate trace for the antenna element). Various techniques may be applied to protect the electronics from potentials that might be induced in the ground plane, disrupting their operation.

For the higher-frequency (Bluetooth, Wi-Fi) operation, the antenna has a dipole arrangement, but for the lower-frequency (NFC) operation, the antenna has a loop arrangement. The dipole can approximate a half wave dipole considering loading and tuning. The creation of either the dipole or loop arrangement can be determined by the state of the choke inductor 30. Also, the choke inductor 30 enables the antenna circuit to include higher-frequency or lower-frequency arrangements that can be tuned independently.

The metallic layer 24 of the smart ring 10 can be a parasitic element with a predetermined thickness. Also, the smart ring 10 may include a gap 42 between the metallic layer 24 and the first and second antenna components 26, 28. The gap 42 may have a predetermined width that can be designed to control the parasitic characteristics of the metallic layer 24.

The second electrical circuit 32 may include the capacitor 46 configured for isolation to protect the higher frequencies from the lower frequencies. Also, isolation by the inductor 52 can protect the lower frequency (NFC) circuits from the higher frequency signals.

Figure 5A:
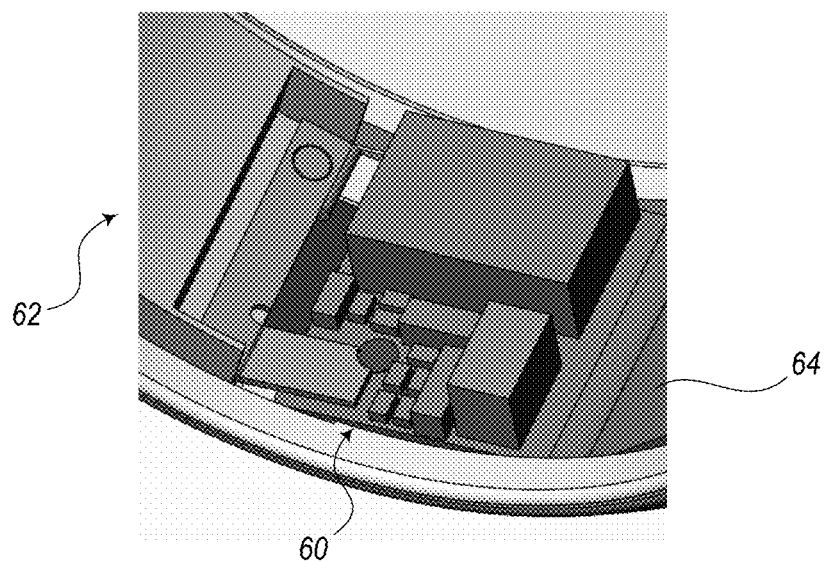
FIGS. 5A and 5B are diagrams illustrating cut-away views of the electrical circuitry of the smart ring of FIG. 1, according to some embodiments.
Figure 5B:
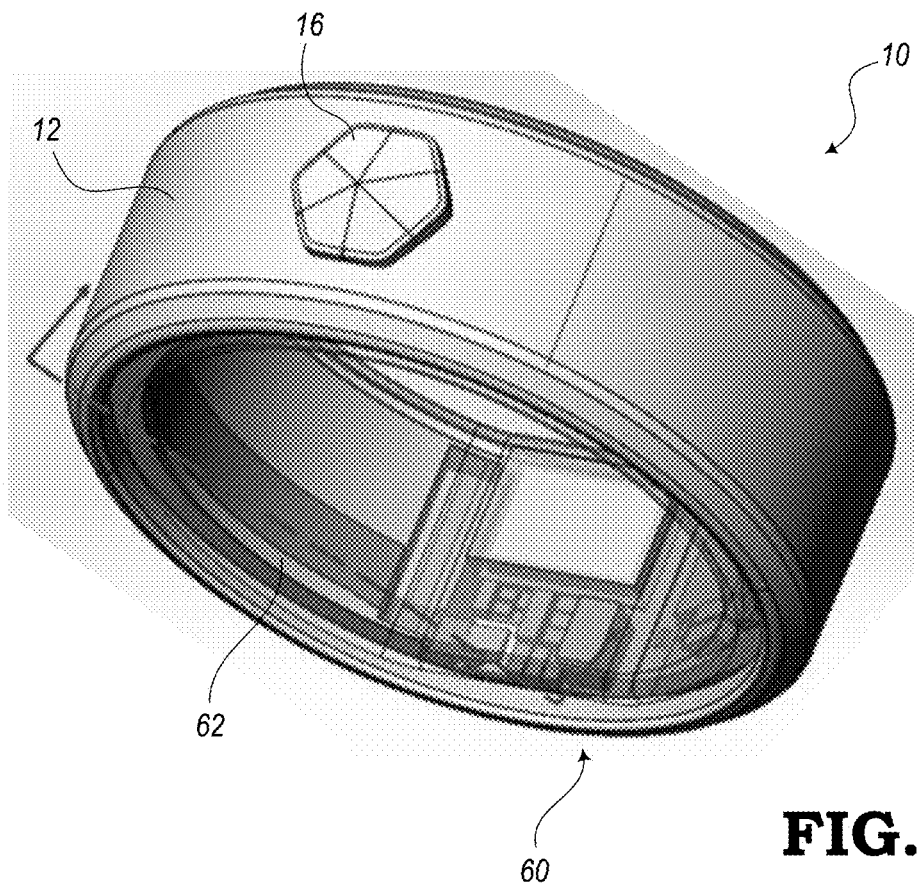

FIGS. 5A and 5B are diagrams illustrating partially cut-away views of the smart ring 10 and showing an embodiment of electrical circuitry 60 therein. The electrical circuitry 60 may be connected to a battery having a battery casing 62. The electrical circuitry 60 may be formed on one or more Printed Circuit Boards (PCBs), Flexible Printed Circuits (FPCs) 64, and/or FPC boards. For example, the FPC 64 may include non-conductive board elements (flexible or rigid) on which the electrical circuitry 60 may reside. The electrical circuitry 60, for instance, may include the higher frequency elements 46, 48, 50 and the lower frequency elements 52, 54, 56, 58 shown in FIG. 4. In addition, the electrical circuitry 60 may include one or more accelerometers or the like for monitoring motion.

Figure 6:
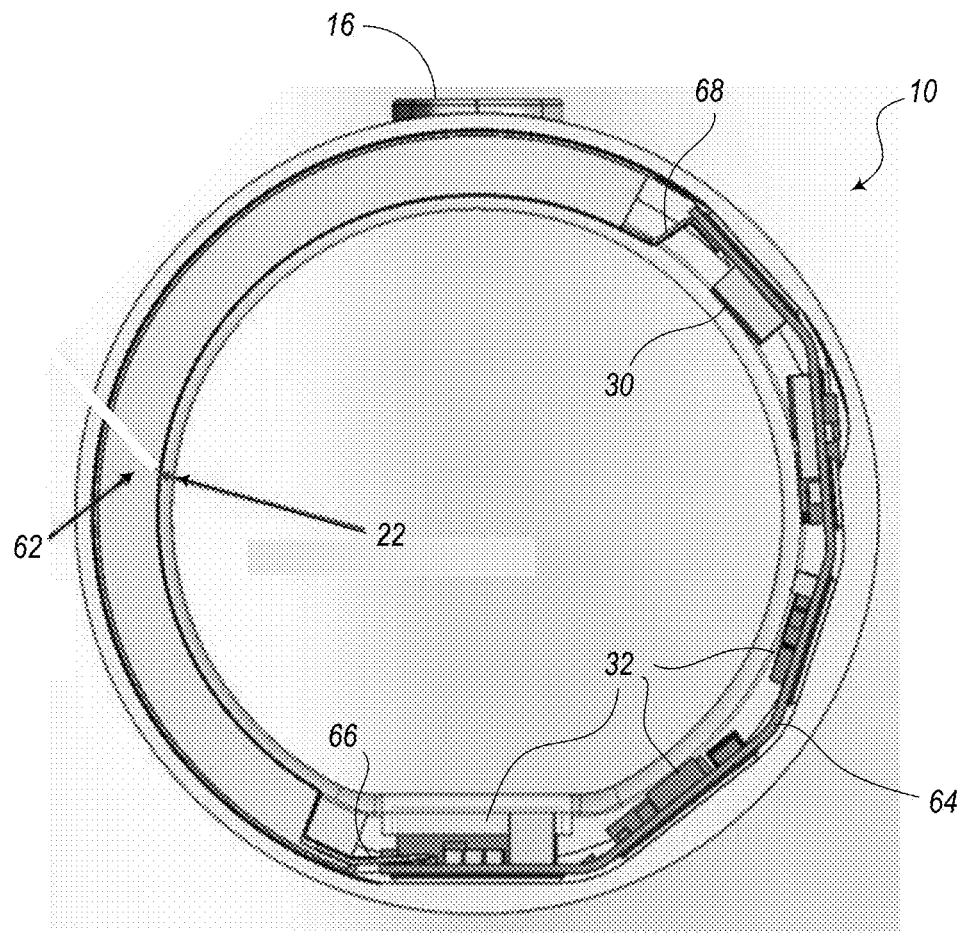
FIG. 6 is a diagram illustrating a cross-sectional view of the smart ring of FIG. 1 showing the electrical circuitry, according to some embodiments.

FIG. 6 is a diagram illustrating a cross-sectional view of the smart ring 10 and showing electrical circuitry therein. The battery casing 62 is embedded in the smart ring 10 and is connected via a first set of connections 66 to the second electrical circuit 32 formed on the FPC 64 for providing power to the second electrical circuit 32. A second set of connections 68 is formed between the other end of the battery casing 62 and the other end of the FPC 64 and is used for connection to and providing power to the first electrical circuit 30, which may also be formed on the FPC 64. The one or more accelerometers may be part of the first electrical circuit 30 and/or the second electrical circuit 32.

In some embodiments, the first or second electrical circuits 30, 32 may include translation or interpretation circuitry. For example, the translation or interpretation circuitry may be configured to convert movement information obtained by the accelerometers to an encoded language corresponding to one or more commands. In one example, the detection of a slow wave of the user's hand 18 in one direction followed by two quick taps of the user's finger 19 against a solid surface may be translated to (or interpreted as) a command to turn on the lights or lamps in a particular room. In another example, a rotational motion of the hand 18 followed by three slow taps may be translated to a command to close the garage door. These commands may then be communicated to the control device for controlling the various electrical devices in the local network setting (e.g., home in which a Wi-Fi network is used).

According to other embodiments, the translation or interpretation mechanisms may be incorporated in a control device. Therefore, the movement information (e.g., hand waving, hand rotating, finger tapping, etc.) may be communicated from the smart ring 10 to the control device. Then, with the translation circuitry, the control device can determine that the sequence, pattern, or other aspects of the movement information are indicative of a user command to perform some sort of control action. In accordance with the intended command, the control device may then automatically control one or more Internet of Things (IoT) devices, things-of-the-Internet devices, lights, lamps, HVAC control, televisions, kitchen appliances, mobile phones, televisions, computers, kitchen appliances, house lights, lamps, ceiling fans, etc.

The electrical circuits 30, 32 may also include a transceiver device or radio communication device. The transceiver device may be configured to as the antennas described above and associated radio circuitry for controlling the transmission and reception of waves, which may be in the Bluetooth frequency range, Wi-Fi frequency range, or other suitable short range communication frequencies for enabling communication between the smart ring 10 and a controller device (e.g., controller device 110 described below) that can control one or more electronic devices in the local network.

The electrical circuits 30, 32 may further include one or more vibration devices configured to provide haptic or tactile feedback to the wearer (user). For example, when the user "enters" a sequence of motions, the vibration devices may be configured to vibrate the smart ring 10 to indicate to the user that the input has been received. Also, if an entry is received that does not correspond to a known command, the vibration devices may be configured to provide a different type of vibration to the smart ring 10 to indicate that there was an error.

Also, in some embodiments, the smart ring 10 may utilize a two-step command entry process. An initial "wake-up" motion may be used before entering a command. That is, the smart ring 10 may remain in a low-power mode until this wake-up motion is received and then the smart ring 10 will wake up and await the following command movements. In this case, the vibration devices may provide a distinct vibration pattern to indicate that the smart ring 10 has been awaken from a sleep mode.

Furthermore, according to some embodiments, the smart ring 10 may also include a microphone, which may be incorporated in the raised feature 16 and may include associated circuitry incorporated in the electrical circuits 30, 32. In these embodiments, the microphone may be used to receive user commands.

Also, the smart ring 10 may include a speaker, which may be used to provide feedback to the user. For example, following the entry of a wake-up request or a command, the speaker can provide a spoken confirmation of the entries or a buzzing or beeping sound to indicate proper or improper entries. The speaker may also be provided in the raised feature 16 and/or incorporated in the electrical circuits 30, 32.

In some embodiments, the smart ring 10 may also include a camera, which can also be incorporated in the raised feature 16. Camera circuit may be incorporated in the electrical circuits 30, 32. The camera, according to some embodiments, may be used to capture an image of an electrical device that the user wishes to change the setting of. For example, the user may direct the camera at a thermostat to indicate that a change command is intended to change the temperature settings of an HVAC system.

Therefore, according to various implementations, a smart ring (e.g., smart ring 10) may be configured to be worn on a finger of a user. The smart ring 10 may include a movement sensing device configured to obtain movement information related to one or more movements of the smart ring while the user is wearing the smart ring 10. Also, the smart ring 10 may include a transceiver (radio) configured to communicate Bluetooth or Wi-Fi signals with a controller device. One or more characteristics of the movement information may be translated so as to obtain one or more "control commands." Also, the controller device may be configured to control one or more aspects of one or more electronic devices based on the one or more control commands.

Furthermore, the smart ring 10 may also include a processing device configured to translate the movement information so as to obtain the one or more control commands. In some embodiments, the smart ring 10 may also include one or more accelerometers for three-dimensional detection of the one or more movements of the smart ring. The one or more accelerometers may be configured to detect speed, force, and direction of the one or more movements over time. Also, the smart ring 10 may include a) one or more vibration device and b) one or more beeper devices configured to provide tactile feedback and/or audio feedback to the user.

The one or more electronic devices that can be controlled may include a) lights, b) lamps, c) ceiling fans, d) garage doors, e) televisions, f) computers, g) mobile phones, h) stoves, i) ovens, j) microwaves, k) refrigerators, l) freezers, m) dishwashers, n) timers or clocks, o) HVAC systems, p) IoT devices, and/or other controllable devices in a specific environment (e.g., home, office, etc.). The action of controlling the one or more aspects of the one or more electronic devices may include a) turning on an electronic device, b) turning off an electronic device, c) changing a speed of an electronic device, d) changing a brightness level, e) changing a channel, f) dialing a phone number, g) changing a temperature level, and/or other actions.

The smart ring 10 may further be configured to enter a sleep mode when not in use for controlling devices. Then, in response to a specific wake-up movement pattern provided by the user, the smart ring 10 can wake up from the sleep mode and prepare to receive more movement input that is indicated of a user's control command, as described in more detail below. The smart ring 10 may further allow the user to perform a set-up routine to customize a correlation between specific movement profiles and specific control commands, as described in more detail below. The band 12 of smart ring may be configured with the width expanded portion 14 or other filler portion to help the user maintain the band 12 in a specific orientation on the finger 19. In accordance with additional implementations, the smart ring 10 may further include one or more of an audio-input microphone, an audio-output speaker, a visual-input camera, and a visual-output light or LED.

Control Systems and Networks

Figure 7:
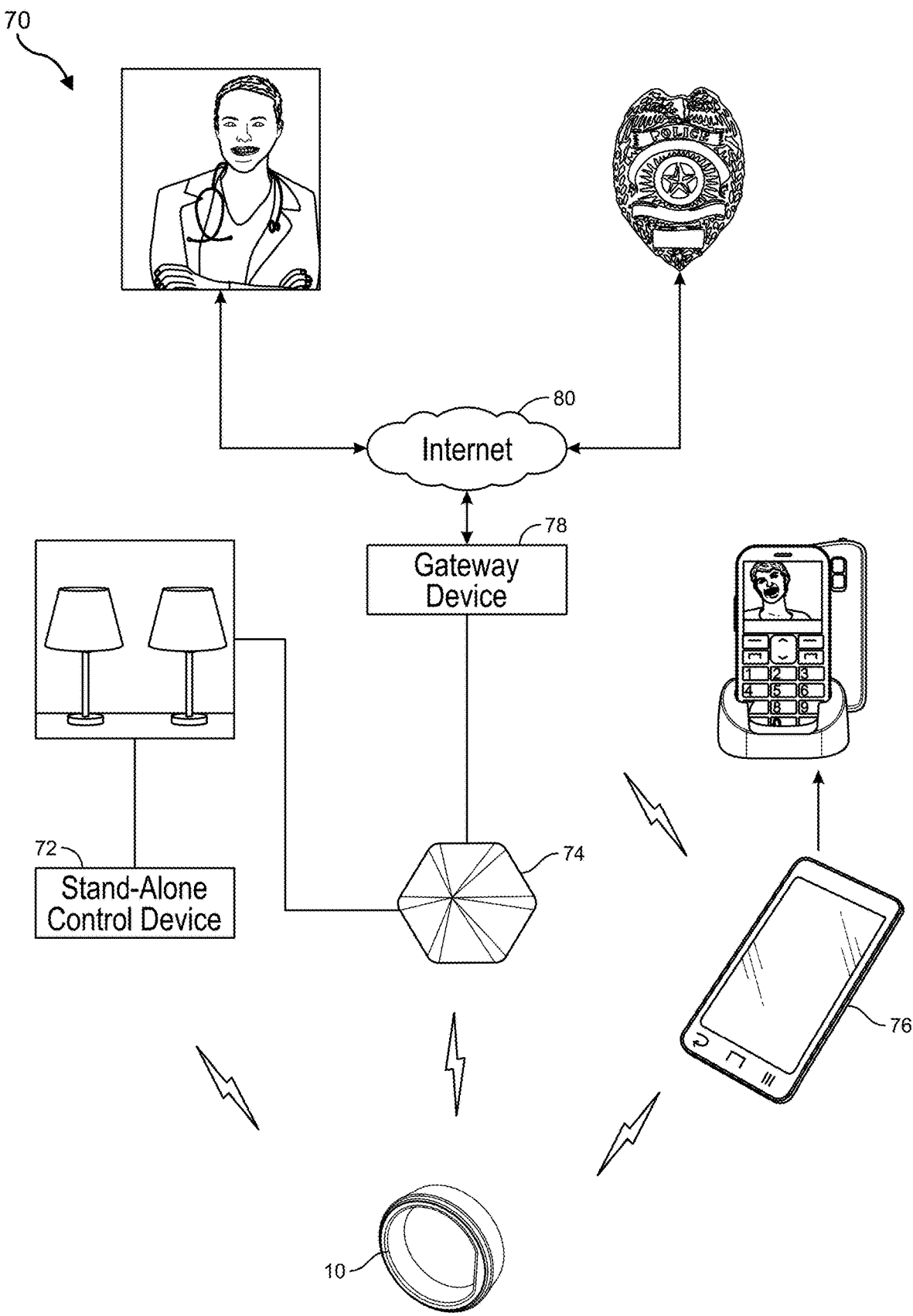
FIG. 7 is a diagram illustrating a communications system in which the smart ring of FIG. 1 is employed, according to some embodiments.

FIG. 7 is a diagram illustrating an embodiment of a communications system 70 or local network in which the smart ring 10 may be employed. The communications system 70 may include any suitable control device or control devices incorporated in any device normally included in a communications system. In some embodiments, one or more control devices may be stand-alone devices having the function of simply responding to commands for controlling electrical devices. For example, the one or more control devices in the communications system 70 may include one or more stand-alone control devices 72, one or more access point devices 74 used in a Wi-Fi network, one or more mobile devices 76 (e.g., cell phone, smart phone, etc.), a gateway device 78, and/or other devices (e.g., router, modem, firewall, network node, computer, controller, etc.). In some embodiments, the control devices 72, 74, 76, 78, etc. may be configured to communicate control commands (or movement information) to a remote server via a network 80 (e.g., the Internet). The remote server may be associated with a medical assistance center, hospital, group of doctors, police department, fire department, or other type of emergency facility.

In response to receiving the control commands (or receiving the movement information that can be interpreted into control commands), the control device or control devices 72, 74, 76, 78 may be configured to perform certain control actions within the communications system 70. The control actions may include a turn-on action (e.g., turn on a light), turn-off action (e.g., turn off a stove), increase action (e.g., increase the volume of speakers of a sound system), decrease action (e.g., lower the temperature setting on an HVAC system), change action (e.g., change the channel of a television), etc. In some embodiments, the control actions may also include dialing a telephone number (e.g., of the mobile device 76) to call a person or group of people.

Thus, according to some implementations, a local control system (e.g., communications system 70) may include a wearable device (e.g., the smart ring 10) that is used as a command input device. For example, smart ring 10 can obtain movement information related to one or more movements of the smart ring 10 while a user is wearing the smart ring 10. The local control system further includes a controller device 72, 74, 76, 78, etc. (labeled generally as controller device 110 in FIG. 9 described below). The controller device 110 is configured to communicate with the smart ring 10 using Bluetooth or Wi-Fi signals. One or more electronic devices having common utility (e.g., lamps, stoves, garage doors, etc.) may be deployed in the communications system 70, as shown in FIG. 7. One or more characteristics of the movement information can be translated (interpreted) so as to obtain one or more control commands. The controller device 110 is further configured to control one or more aspects of the one or more electronic devices based on the one or more control commands.

The local control system (e.g., communications system 70) may include a smart ring that includes a processing device configured to translate the movement information so as to obtain the one or more control commands. In other embodiments, the controller device 110 may translate the movement information to control commands. The smart ring 10 may include one or more accelerometers for three-dimensional detection of the one or more movements of the smart ring 10. The three-dimensional detection may include detection of speed, force, and direction of the one or more movements over time.

The controller device may include one or more of the mobile phone 76, an access point 74 of a Wi-Fi network, a mesh pod, a Bluetooth hub 72, a relay device, a Wi-Fi gateway device 78, a modem, or other component of a Wi-Fi network. The controller device 72, 74, 76, 78, 110 may communicate with the smart ring 10 via one or more of the other components in the Wi-Fi network, based on the particular network layout. The smart ring 10 may further include one or more of a vibration device and a beeper device configured to provide audio or tactile feedback to the user. The controller device may be a cloud-based controller.

The one or more electronic devices to be controlled may include a) lights, b) lamps, c) ceiling fans, d) garage doors, e) televisions, f) computers, g) mobile phones, h) stoves, i) ovens, j) microwaves, k) refrigerators, l) freezers, m) dishwashers, n) timers or clocks, o) HVAC systems, p) IoT devices, and/or other devices. The actions of controlling the one or more aspects of the one or more electronic devices may include a) turning on an electronic device, b) turning off an electronic device, c) changing a speed of an electronic device, d) changing a brightness level, e) changing a channel, f) dialing a phone number, g) changing a temperature level, and/or other suitable control actions based on the type of electronic device being controlled and the various corresponding aspects that can be controlled. In some embodiments, the above-described local control system (e.g., communications system 70) may further include one or more additional smart rings 10, which can be worn by the user on other fingers. In this respect, each smart ring 10 can be configured to obtain movement information and communicate the movement information or one or more control commands to the controller device.

Figure 8:
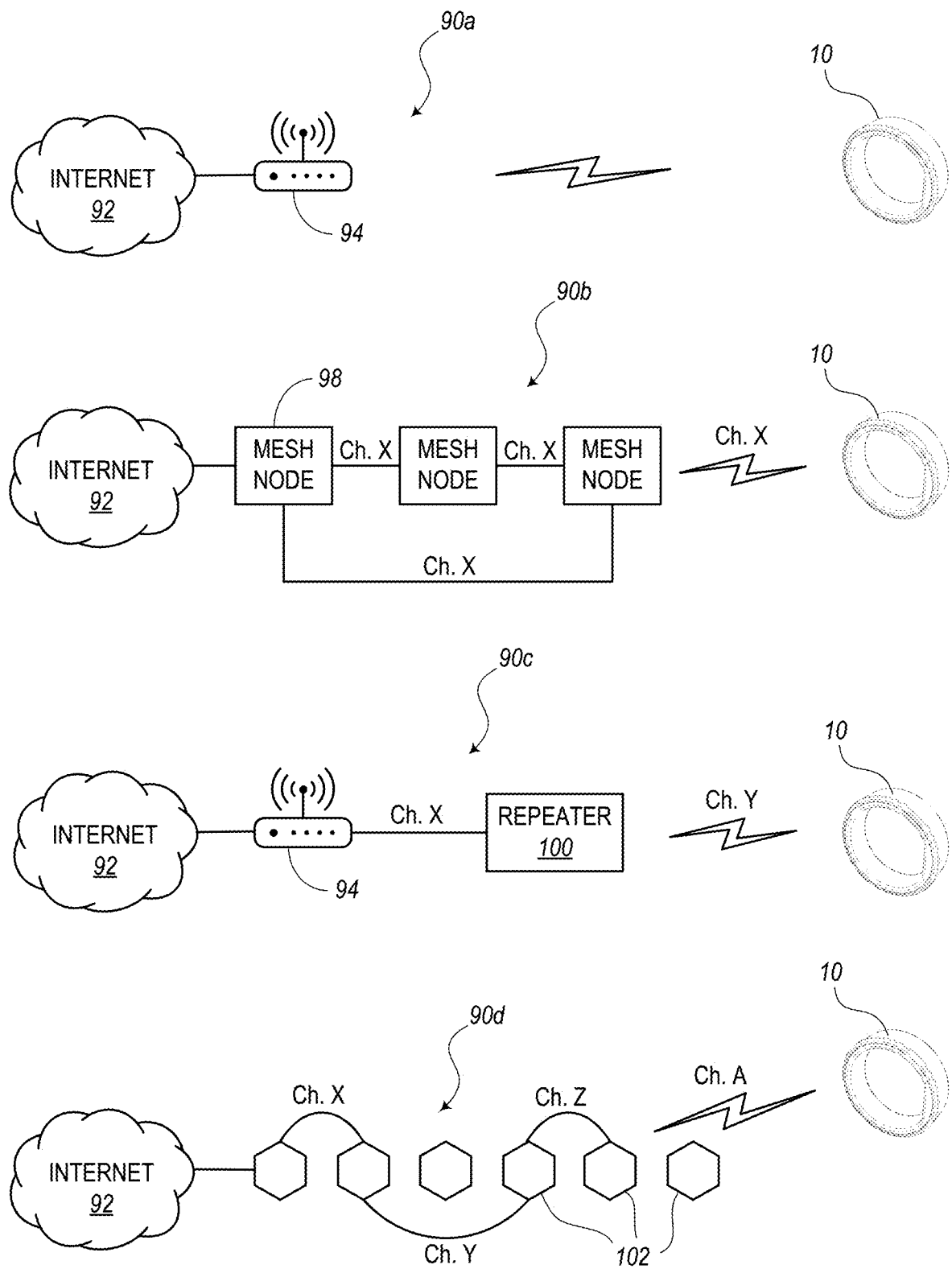
FIG. 8 is a diagram illustrating various Wi-Fi networks in which the smart ring of FIG. 1 is employed, according to some embodiments.

FIG. 8 is a diagram illustrating various Wi-Fi networks 90a, 90b, 90c, 90d in which the smart ring 10 may be employed. The Wi-Fi networks 90a, 90b, 90c, 90d may be local networks in a home or office for connectivity or access to the Internet 92. The Wi-Fi networks 90 can operate in accordance with the IEEE 802.11 protocols and variations thereof. The Wi-Fi networks 90 are deployed to provide coverage in a physical location (e.g., home, business, store, library, school, park, etc.). The different topologies of the Wi-Fi networks 90 may provide different scopes of physical coverage. As described herein, the Wi-Fi network 90 can be referred to as a network, a system, a Wi-Fi network, a Wi-Fi system, a cloud-based Wi-Fi system, etc. The Wi-Fi networks 90 may utilize one or more access points 94. In some embodiments, the Wi-Fi networks 90 may also or alternatively include mesh nodes 98, repeater 100, Wi-Fi pods or modules 22, and/or other components, which can be referred to as nodes, access points, Wi-Fi nodes, Wi-Fi access points, etc.

One objective of nodes is to provide network connectivity to the smart ring 10, which in some cases can be referred to as client devices, user equipment, user devices, clients, Wi-Fi clients, Wi-Fi devices, etc. It may also be noted that other types of Wi-Fi client devices, which may be configured for connectivity with the Internet 92, can be mobile devices, tablets, computers, consumer electronics, home entertainment devices, televisions, Internet of Things (IoT) devices, or any network-enabled devices.

The Wi-Fi network 90a includes a single access point 94, which can be a single, high-powered access point and may be centrally located to serve all smart rings 10 and Wi-Fi client devices in a location. Of course, a typical location can have several walls, floors, etc. between the single access point 14 and the Wi-Fi client devices (e.g., smart ring 10). Plus, the single access point 14 operates on a single channel (or possible multiple channels with multiple radios), leading to potential interference from neighboring systems.

The Wi-Fi network 90b is a Wi-Fi mesh network that solves some of the issues with the single access point 94 by having multiple mesh nodes 98, which distribute the Wi-Fi coverage. Specifically, the Wi-Fi network 90b operates based on the mesh nodes 98 being fully interconnected with one another, sharing a channel (e.g., channel X) between each of the mesh nodes 98 and the smart ring 10 and/or other Wi-Fi client devices. That is, the Wi-Fi network 90b may be a fully interconnected grid, sharing the same channel, and allowing multiple different paths between the mesh nodes 98 and the smart ring 10 and/or Wi-Fi client devices. However, since the Wi-Fi network 90b uses the same backhaul channel, every hop between source points divides the network capacity by the number of hops taken to deliver the data. For example, if it takes three hops to stream a video to a Wi-Fi client device, the Wi-Fi network 90b may be left with only one-third the capacity.

The Wi-Fi network 90c includes the access point 94 coupled wirelessly to one or more Wi-Fi repeaters 100. The Wi-Fi network 90c with the Wi-Fi repeaters 100 may be configured with a star topology, whereby there is at most one Wi-Fi repeater 100 between the access point 94 and the Wi-Fi client device (or smart ring 10). From a channel perspective, the access point 94 can communicate to the Wi-Fi repeater 100 on a first channel (e.g., Channel X) and the Wi-Fi repeater 100 can communicate to the smart ring 10 and/or Wi-Fi client devices on a second channel (e.g., Channel Y). The Wi-Fi network 90c solves the problem with the Wi-Fi mesh network of requiring the same channel for all connections by using a different channel or band for the various hops to prevent slowing down the Wi-Fi speed. It may be noted that some hops may use the same channel or band, but this is not required. One disadvantage of the repeater 100 is that it may have a different Service Set Identifier (SSID) from the access point 94, which is effectively different Wi-Fi networks from the perspective of the Wi-Fi client devices.

Despite Wi-Fi's popularity and ubiquity, many consumers still experience difficulties with Wi-Fi. The challenge of supplying real-time media applications is that it puts increasing demands on the throughput, latency, jitter, and robustness of Wi-Fi. Studies have shown that broadband access to the Internet through service providers is up 99.9% of the time at high data rates. However, despite the Internet arriving reliably and quickly to the edge of consumer's homes, simply distributing the connection across the home via Wi-Fi is much less reliable, leading to poor user experience.

Several issues that prevent conventional Wi-Fi systems from performing well include i) interference, ii) congestion, and iii) coverage. Regarding interference, the growth of Wi-Fi has come with the growth of interference between different overlapping Wi-Fi networks. When two networks within range of each other carry high levels of traffic, they tend to interfere with each other, reducing the throughput that either network can achieve. Regarding congestion, within a single Wi-Fi network, there may be several communications sessions running. When several demanding applications are running, such as high-definition video streams, the network can become saturated, leaving insufficient capacity to support the video streams. Regarding coverage, Wi-Fi signals attenuate with distance and when they travel through walls and other objects. In many environments, such as large residences, reliable Wi-Fi service cannot be obtained in all rooms. Even if a basic connection can be obtained in all rooms, many locations will have poor performance due to a weak Wi-Fi signal. Various objects in a residence (e.g., walls, doors, mirrors, people, and general clutter) all interfere and attenuate Wi-Fi signals leading to slower data rates.

Two general approaches have been tried to improve the performance of conventional Wi-Fi systems, as illustrated in the Wi-Fi networks 90b, 90c. The first approach (i.e., Wi-Fi network 90a) is to simply build more powerful single access points 94, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point 94, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

Other approaches (i.e., Wi-Fi network 90b, 90c) is to use a mesh of Wi-Fi devices 98 or repeaters 100 to repeat the Wi-Fi data throughout a location, as illustrated in the Wi-Fi networks 90b, 90c. These approaches are fundamentally better approaches to achieving better coverage. By placing even a single repeater 100 in the center of a house, the distance that a single Wi-Fi transmission must traverse can be cut in half, halving also the number of walls that each hop of the Wi-Fi signal must traverse. This can make a change in the link budget of 40 dB or more, a huge change compared to 6 dB to 12 dB type improvements that can be obtained by enhancing a single access point 94 as described above. Mesh networks have similar properties as systems using Wi-Fi repeaters 100. A fully interconnected mesh adds the ability for all the mesh nodes 98 to be able to communicate with each other, opening the possibility of packets being delivered via multiple hops following an arbitrary pathway through the network.

The Wi-Fi network 90d includes various Wi-Fi devices 102 that can be interconnected to one another wirelessly (e.g., Wi-Fi wireless backhaul links) or wired, in a tree topology, where there is one path between the Wi-Fi client device (or smart ring 10) and the gateway 78 (e.g., a Wi-Fi device 102 connected to the Internet 80, 92), but which allows for multiple wireless hops unlike the Wi-Fi repeater network and multiple channels unlike the Wi-Fi mesh network. For example, the Wi-Fi network 90*d* can use different channels/bands between Wi-Fi devices 102 and between the smart ring 10 and/or Wi-Fi client device (e.g., Ch. X, Y, Z, A), and, also, the Wi-Fi system 90*d* does not necessarily use every Wi-Fi device 102, based on configuration and optimization. The Wi-Fi network 90*d* is not constrained to a star topology as in the Wi-Fi repeater network 90*c* which at most allows two wireless hops between the Wi-Fi client device (or smart ring 10) and a gateway (e.g., gateway 78, access point 94, etc.). Wi-Fi is a shared, simplex protocol meaning only one conversation between two devices can occur in the network at any given time, and if one device is talking, the others need to be listening. By using different Wi-Fi channels, multiple simultaneous conversations can happen simultaneously in the Wi-Fi network 90*d*. By selecting different Wi-Fi channels between the Wi-Fi devices 22, interference and congestion can be avoided or minimized.

Of note, the systems and methods described herein contemplate operation through any of the Wi-Fi networks 90, including other topologies not explicated described herein. Also, if there are certain aspects of the systems and methods which require multiple nodes in the Wi-Fi network 90, this would exclude the Wi-Fi network 90*a*.

Figure 9:
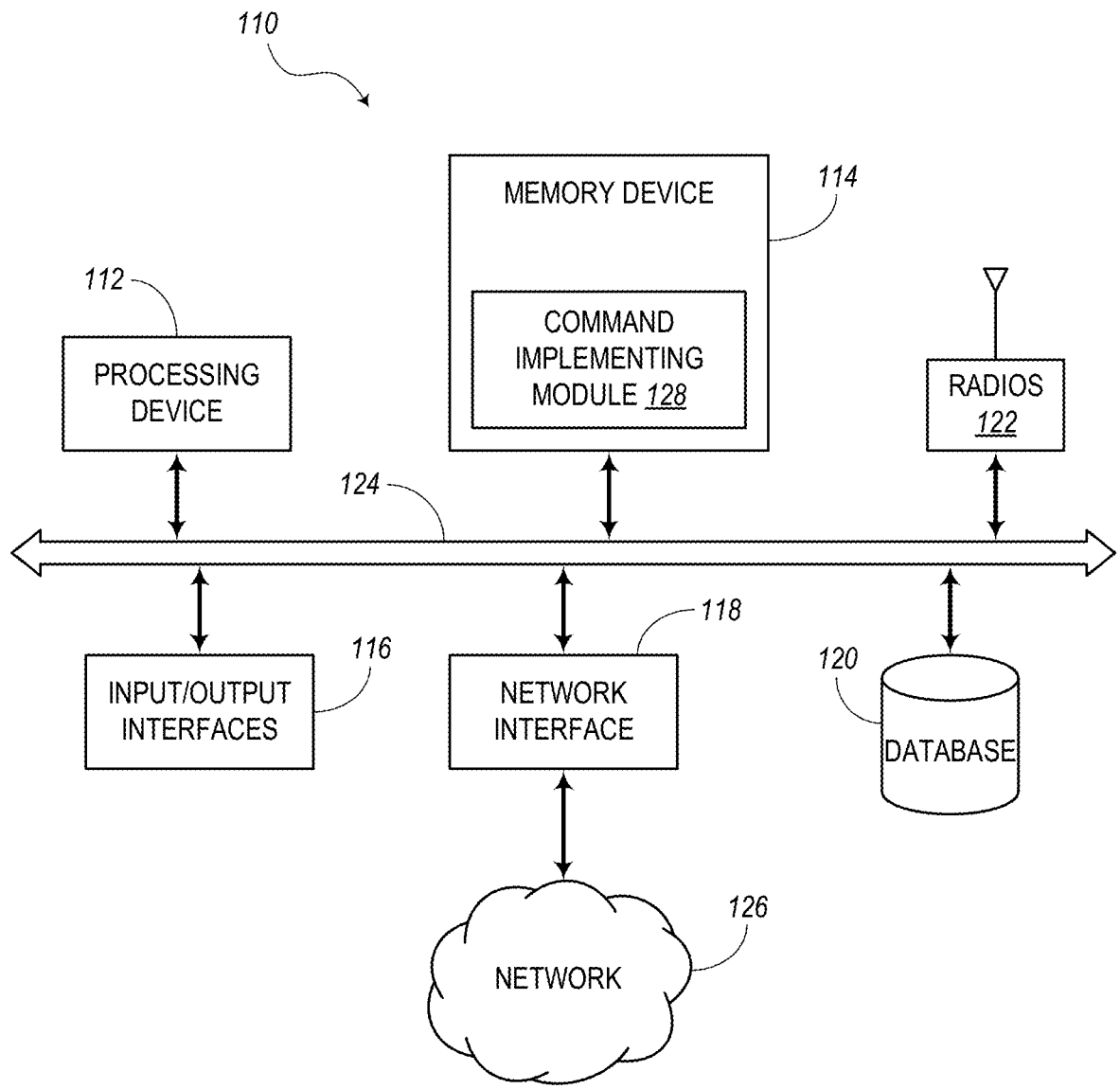
FIG. 9 is a block diagram illustrating a controller device configured to control devices in a local network based on control commands received from the smart ring of FIG. 1, according to some embodiments.

FIG. 9 is a block diagram illustrating an embodiment of a controller device 110 configured to control electrical devices in a local network (communications network 70, Wi-Fi network 90*a*, 90*b*, 90*c*, 90*d*, etc.) based on control commands received from the smart ring 10. For example, the controller device 110 may be incorporated in the stand-alone control device 72, access point 74, mobile device, gateway 78, or other suitable network devices.

In the illustrated embodiment, the controller device 110 may be a digital computing device that generally includes a processing device 112, a memory device 114, Input/Output (I/O) interfaces 116, a network interface 118, a database 120, and one or more radios 122. It should be appreciated that FIG. 9 depicts the controller device 110 in a simplified manner, where some embodiments may include additional components and suitably configured processing logic to support known or conventional operating features. The components (i.e., 112, 114, 116, 118, 120, 122) may be communicatively coupled via a local interface 124. The local interface 124 may include, for example, one or more buses or other wired or wireless connections. The local interface 124 may also include controllers, buffers, caches, drivers, repeaters, receivers, among other elements, to enable communication. Further, the local interface 124 may include address, control, and/or data connections to enable appropriate communications among the components 112, 114, 116, 118, 120, 122.

It should be appreciated that the processing device 112, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 112 may also include or utilize stored program instructions (e.g., stored in hardware, software, and/or firmware) for control of the controller device 110 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 114 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 114 may incorporate electronic, magnetic, optical, and/or other types of storage media. The memory device 114 may have a distributed architecture, where various components are situated remotely from one another, but can be accessed by the processing device 112.

The memory device 114 may include a data store, database (e.g., database 120), or the like, for storing data. In one example, the data store may be located internal to the controller device 110 and may include, for example, an internal hard drive connected to the local interface 124 in the controller device 110. Additionally, in another embodiment, the data store may be located external to the controller device 110 and may include, for example, an external hard drive connected to the Input/Output (I/O) interfaces 116 (e.g., SCSI or USB connection). In a further embodiment, the data store may be connected to the controller device 110 through a network and may include, for example, a network attached file server.

Software stored in the memory device 114 may include one or more programs, each of which may include an ordered listing of executable instructions for implementing logical functions. The software in the memory device 114 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 112), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 112 or other suitable circuitry or logic). For example, when executed, the instructions may cause or enable the processing device 112 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 112), or any suitable combination thereof. Software/firmware modules may reside in the memory device 114, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 116 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 116 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The radios 122 enable wireless communication in the Wi-Fi network 70, 90. The radios 122 can operate according to the IEEE 802.11 standard. The radios 122 include address, control, and/or data connections to enable appropriate communications on the Wi-Fi network 70, 90. As described herein, the controller device 110 or node can include a plurality of radios to support different links (e.g., backhaul links, client links, etc.). The radios 122 can also include Wi-Fi chipsets configured to perform IEEE 802.11 operations. In some embodiments, an optimization can determine the configuration of the radios 122 such as bandwidth, channels, topology, etc. In some embodiments, the controller device 110 supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the controller device 110 can support IEEE 802.11AC1200 gigabit Wi-Fi (300 +867 Mbps). Also, the controller device 110 can support additional frequency bands such as 6 GHz, as well as cellular connections.

The network interface 118 may be used to enable the controller device 110 to communicate over a network 126, network 80, the Internet 92, a Wide Area Network (WAN), a Local Area Network (LAN), and the like. The network interface 118 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The network interface 118 may include address, control, and/or data connections to enable appropriate communications on the network 126.

The controller device 110 may also include a command implementing module 128. The command implementing module 128 may be configured in any suitable combination of hardware (e.g., in the processing device 112) and/or software or firmware (e.g., in the memory device 114). The command implementing module 128 may include computer logic or instructions for enabling or causing the processing device 112 to perform certain functions. The command implementing module 128 may be configured to enable the processing device 112 to receive control commands from a trigger device (e.g., smart ring 10) via the network interface 118 or radios 122. The command implementing module 128 may be configured to receive simple movement information from the trigger device or smart ring 10 and interpret or translate these movements into the commands. Again, the commands may include various control instructions for changing the state of an electrical device from on to off, or vice versa, for changing a level of a variably modifiable electrical device (e.g., changing the volume of a sound system), dialing a phone number, and/or performing other actions based on other types of commands.

Set-up Processes

Figure 10:
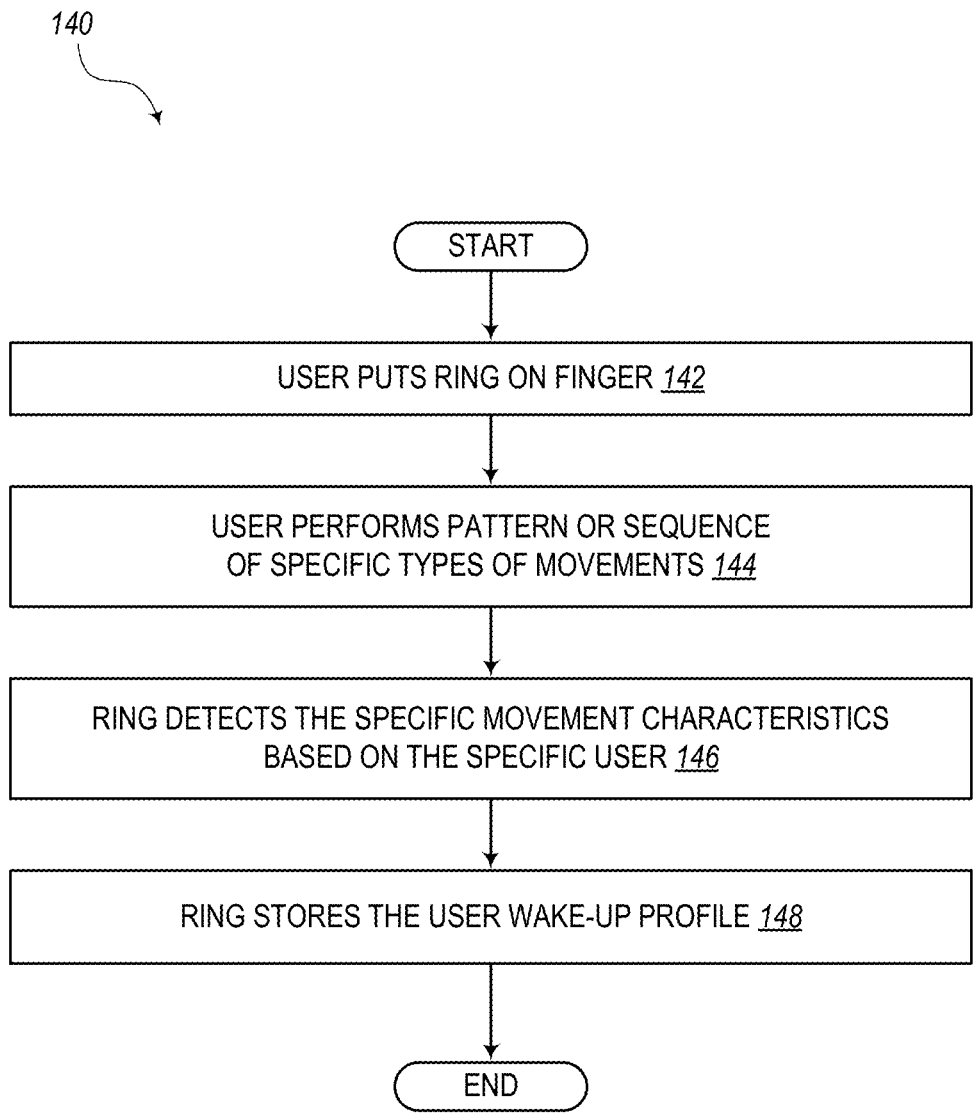
FIG. 10 is a flow diagram illustrating a process for entering or setting up a wake-up profile for a user of the smart ring of FIG. 1.

FIG. 10 is a flow diagram illustrating an embodiment of a process 140 for entering or setting up a wake-up profile for a user of the smart ring 10. In a scenario where more than one user intends to use the smart ring 10, the process 140 can be repeated for each user. The process 140 may be performed when a user first purchases the smart ring 10 or uses the smart ring 10 for the first time. To initiate this set-up procedure, the user may be instructed to perform a certain action, such as press a button (e.g., on the raised feature 16) for an extended time (e.g., several seconds). In some embodiments, instructions for set-up may be provided to the user in literature that comes with the packaging of the smart ring 10 or may be set-up instructions downloaded on a user's cell phone, or by other means.

The process 140 includes allowing the user to put the ring on the user's finger, as indicated in block 142. Then, the process 140 includes allowing the user to perform a pattern or sequence of one or more specific types of movements, as indicated in block 144. These movements may include, for example, one or more of tapping the finger on a surface, using another finger to tap the ring directly, moving the user's arm, wrist, finger, etc. in a specific manner, such as rolling motions, rotating motions, roll, pitch, or yaw motions, waving motions, etc. In some embodiments, the movement pattern may be a customized pattern that the user creates, while, in other embodiments, the movement pattern may be a preset pattern set by the manufacturer. It should be noted that this movement pattern described with respect to the process 140 is a "wake-up" sequence for waking the smart ring 10 from a sleep mode. Hence, the smart ring 10 does not necessarily need to analyze every action that the user makes throughout a typical day, which would use an unnecessarily large amount of battery power.

Next, the process 140 includes allowing the smart ring 10 to detect the specific movement characteristics of the wake-up pattern, as indicated in block 146. These specific movement characteristics may include force profile information (e.g., sensed by accelerometers) that measures the forces, levels, expressiveness parameters, etc. of the user's movements. For example, some users may use minimal movements to enter commands, while others may be more dynamic. Thus, the smart ring 10 can pick up the specific user's tendencies and mannerisms. The process 140 further includes the step of allowing the smart ring 10 to store the user wake-up profile, which can then be used to determined when the user intends to wake-up the smart ring 10 and enter a command.

Figure 11:
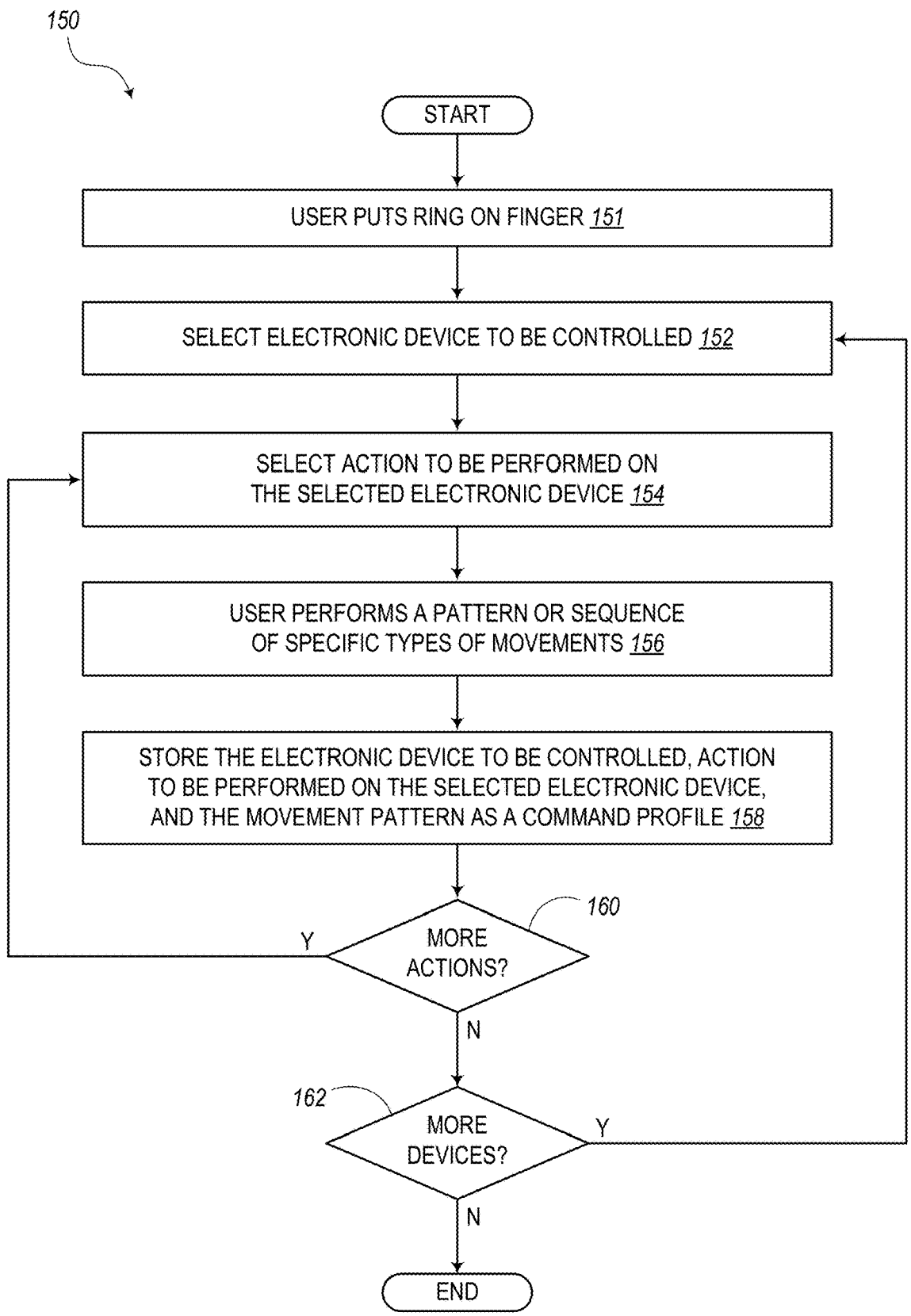
FIG. 11 is a flow diagram illustrating a process for entering or setting up movement patterns for controlling one or more specific electronic devices in a local network.

FIG. 11 is a flow diagram illustrating an embodiment of a process 150 for entering or setting up movement patterns for controlling one or more specific electronic devices in a local network. Again, this process 150 can be repeated for each user, assuming that multiple users intend to use the smart ring 10. The process 150 of FIG. 11 may be performed when a user first purchases the smart ring 10 or uses the smart ring 10 for the first time, similar to the process 140. It should be noted that the process 150 involves not only the smart ring 10, but also a local network (with a controller device) for enabling control of one or more electronic devices based on "movement profiles" or "command profiles," as defined herein.

The process 150 includes allowing the user to place the ring on the user's finger, as indicated in block 151. Then, the process includes allowing the user to select a specific electronic device (e.g., lights, lamps, ceiling fans, electrically-controllable window shades, kitchen appliances, mobile phones, televisions, computers, HVAC systems, kitchen appliances, such as stoves, ovens, microwaves, refrigerators, freezers, dishwashers, and timers, IoT devices, etc.). These and other devices are the ones which the user may wish to recognize as a controllable device. It may be noted that the electronic devices may be connected in the local network in a way that allows these devices to be controlled in one or more ways. For example, a light fixture may be configured with a dimmer switch, whereby the local network may be configured to control the light fixture by turning off the lights, turning on the lights, increasing the brightness of the lights, or dimming the brightness of the lights.

Next, the process 150 includes selecting a specific action that can be performed on the selected electronic device, as indicated in block 154. In the light fixture and dimmer switch example, one specific action (of any possible number of actions) may be the command to "turn on the lights." Then, the process 150 includes allowing the user to perform a pattern or sequence of one or more specific types of movements, as indicated in block 156. Similar to block 144 of the process 140, this step (block 156) may be a customized pattern unique to the user or may be a preset pattern. The motions, for example, may be soft or forceful taps, quick or slow vibrations, large or small rotation movements, slow, fast, wide, or narrow waving patterns, specific motion directions, etc.

The process 150 further includes the step of storing a) the selected device to be controlled (from block 152), b) the control action to be performed on the selected device (from block 154), and c) the movement pattern (from block 156), as indicated in block 158. The movement patterns may include profiles regarding the force of taps, the speed (e.g., slow, fast, regular speed) of motions, the radius of hand roll motions, the extend of up and down motions, etc. The information may be stored (e.g., in memory) on the smart ring 10 itself and/or, according to other embodiments, may be stored in the controller device 110. The combination of information may be defined as a command profile to associate the specific user movements with a specific control action to be performed on a specific electronic device.

Also, the process 150 includes the step of determining if more control actions are to be added for the specific electronic device, as indicated in condition diamond 160. Referring again to the light fixture and dimming switch example, another command (e.g., "turn the lights off," "dim the lights," etc.) may be added. If more control actions are to be added for this device, the process 150 returns to block 154 where another action can be selected and another user movement pattern can be recorded. However, if no more actions are needed for this device, the process 150 proceeds to condition diamond 162, which determines whether more electronic devices are intended to be entered as controllable devices. If so, the process 150 returns back to block 152 where the steps of selecting a new device, selecting control actions, and storing command profiles are performed. Otherwise, if no more devices are to be set up, then the process 150 ends, which thereby ends the set-up procedures for the user. Once set up, the user may use the smart ring 10, as described below with respect to FIG. 12, to provide control commands to various electronic devices within the local network.

In-use Process

Figure 12:
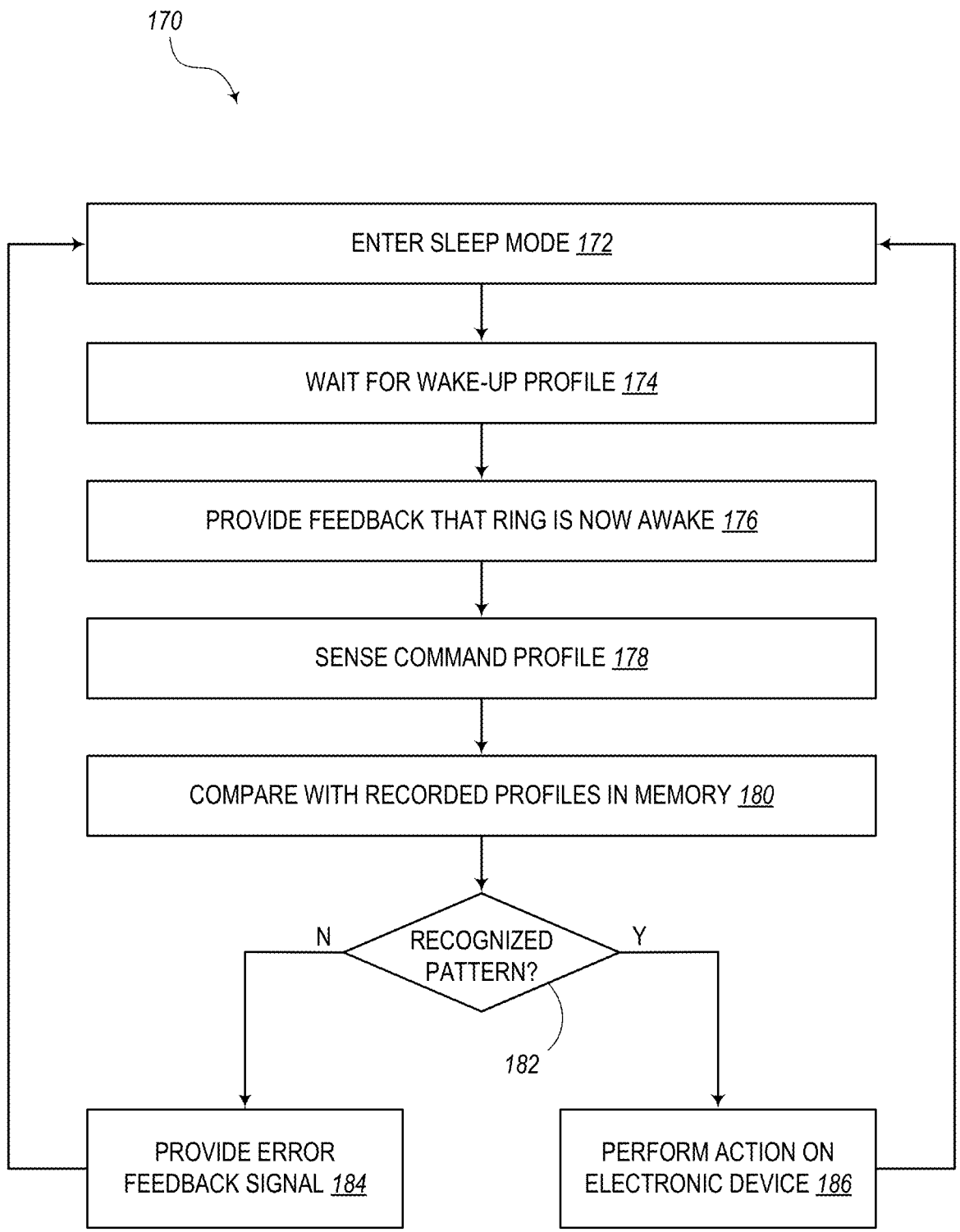
FIG. 12 is a flow diagram illustrating a process for performing control actions based on user commands using the smart ring of FIG. 1

FIG. 12 is a flow diagram illustrating an embodiment of a process 170 for performing control actions based on user commands using the smart ring 10. The smart ring 10 may be configured to power up and/or remain in a sleep mode during most of the day. The process 170 includes allowing the smart ring 10 to enter the sleep mode or low-power mode, as indicated in block 172, to minimize battery consumption during times when the user is not entering control commands. The process 170 includes waiting for the user to enter the wake-up profile, pattern, or sequence as defined in the process 140 of FIG. 10. Once the smart ring 10 detects this wake-up profile, the process 170 moves on to block 176, which includes the step of providing a feedback signal to the user that the smart ring has detected the wake-up profile and has waken up from the sleep mode. This feedback signal may be a specific vibration pattern, beeping sound, etc. to indicate that the smart ring 10 is now ready to receive the control command.

The process 170 further includes the step of sensing a following command profile, as indicated in block 178. The command profile may be any pattern or sequence of one or more movements or motions, which may be detected by the accelerometers. Next, the process 170 includes comparing the sensed command profile with entries in memory where the pre-defined movement patterns (block 158 of process 150) can be stored. The process 170 further includes determining if the command profile is a recognized pattern (e.g., if it matches the pre-stored movement patterns). If not, then the smart ring 10 may provide some type of error feedback to the user (e.g., certain vibration pattern, beeping pattern, etc.), as indicated in block 184, and then returns the smart ring 10 to the sleep mode (block 172).

If the sensed command profile is recognized as a preset (or customized) movement profile matching the pre-stored profiles on the smart ring 10, then the process 170 goes from the condition diamond 182 to block 186. As indicated in block 186, the process 170 includes performing the specific action on the specific electronic device, according to the control profile set-up steps described with respect to FIG. 11. In some cases, the processing of motion patterns may be a continuous type of control commands. For example, if the user wishes to change the volume on a stereo or sound system, the user may repeat a motion in one way (e.g., continuous clockwise-directed motion) to continuously increase the volume of the stereo and/or repeat a motion in another way (e.g., continuous counter-clockwise-directed motion) to continuously decrease the volume. After performing the control actions on the intended device, the process 170 returns back to block 172 to allow the smart ring 10 to enter the sleep mode again and wait for the next wake-up routine.

Additional Implementations

According to some embodiments, the set-up processes 140, 150 may include additional steps to allow a user to "practice" or repeat certain motions or movements. This practice may be compared with previously stored movement profiles to adjust the profiles as needed. For example, if a user injures his or her hand or finger, the user may temporarily use slightly different motions. Also, practicing may help the user become more comfortable with the smart ring 10 so that the user can establish more consistent motion entry.

Also, according to some embodiments, the user may enter, mimic, or practice a number of regular activities that the user may normally do and which are not related to the entry of control commands. Thus, during set-up, the user can perform certain regular habits or actions not related to command entries. These can then be used to distinguish these certain actions from commands. These actions can then be stored as being unrelated to commands or the wake-up procedure. For example, some normal activities may include typing on a keyboard, texting on a mobile device, playing an instrument (e.g., piano, guitar, drum, etc.), turning pages of a book, magazine, or newspaper, using a TV remote control, regular or nervous finger-tapping habits, etc.

The smart ring 10 may be configured to distinguish between these normal non-command activities and those movement that are intended to wake-up and/or enter a command. Then, according to one example, the smart ring 10 would not confuse the user's finger motions while playing Für Elise on the piano as a command to turn on the oven. These conflicting motions can also be stored in memory and ignored as simply normal user activity unrelated to commands.

To allow the user to be able to control electronic devices at any time, the smart ring 10 may have a comfortable fit and may be durable enough (e.g., waterproof) so that control commands can be entered at any time (e.g., 24/7) during the day. Also, if the user needs to make an emergency phone call and is otherwise unable to use his or her cell phone, the user may wake-up the smart ring 10 and enter a command to call emergency services (e.g., ambulance, police, fire department, etc.) or to contact a friend, relative, care group, nurse, doctor, as needed.

The smart ring 10 may be worn on a finger of a user. The smart ring 10 may include a movement sensing apparatus configured to obtain movement information related to movement of the finger of the user while the smart ring is worn on the finger of the user. The smart ring 10 may also include a transceiver configured to communicate Bluetooth or Wi-Fi signals with a controller device 110 in a local network. In this sense, the smart ring 10 can be used in a local network system (e.g., Wi-Fi network). One or more characteristics of the movement information can be translated (e.g., either by the smart ring 10 itself or by the controller device 110) so as to obtain one or more user commands. The controller device 110 is then configured to control one or more aspects (e.g., on state, off state, increase a specific level, decrease as specific level, change a setting, dial a phone number, etc.) of one or more electrical devices based on the one or more user commands.

In some embodiments, the smart ring 10 may be replaced with some other type of wearable item, such as a bracelet, arm band, ankle band, etc. The wearable item can have a movement sensing apparatus for detecting movement of the user's hand or finger and may then communicate movement information or encoded control commands using Bluetooth or Wi-Fi communication. The motions can be interpreted (or translated) as commands by either the smart ring 10 itself or by the controller device 110. Thus, the smart ring 10 can send either motion information for translation by the controller device 110 or commands that the controller device 110 can use to control the one or more electronic devices based on the control commands.

The motion or movement sensing may include three-dimensional (x, y, z) motion and may utilize one or more accelerometers. The movement detection may include detecting speed and direction of movements, waving motions, hand gestures, quick or slow have waving, rotational motions, up and down motions, side-to-side motions, hand or finger wiggling actions, quick or slow tapping finger on a hard or soft surface, quick or slow tapping on the ring itself (e.g., by another finger), knocking, detects sudden stops, and/or any combinations of these actions. These motions can be detected by various direction, velocity, force, acceleration parameters to create a movement profile for entering commands.

The smart ring 10 can detect short command profiles (e.g., two or three specific motions for indicating a simple command, such as turning on lights). In some cases, the movement activities may be continuous or proportional to some characteristic of the motion. These types of continuous movement may be used (interpreted) as making variable, analog, or non-binary changes, such as adjusting the volume of speakers in a continuous manner until a desired level is reached. Proportional movements may be interpreted as changing based on a range of intensity, range of rotational radii, etc., such as, for example, a greater (or more intense) movement may be configured to adjust some level to a greater degree. For example, how far a user's hand is move, the more the increase or decrease in a lighting level.

In some embodiments, the smart ring 10 may communicate directly with the controller device 110. In other embodiments, an intermediate device (e.g., hub, beacon device, adapter, mesh pod, Wi-Fi gateway device, modem, one or more access points, mobile device, etc.) may be used to relay control signals to the controller device 110. In some embodiments the controller device 110 itself may be a mobile phone, access point, pod, Bluetooth hub (or pod, beacon, or adapter), a Wi-Fi gateway device, a modem, etc.

The control command systems may be configured to control of normal everyday electronic devices to allow control in multiple ways during a user's activities. In some embodiments, however, the control command system may be associated with emergency or urgency command systems via the cloud for communicating a need (e.g., medical emergency) to emergency contact personnel (e.g., hospital, doctor, ER, nurse, healthcare professional, care group, etc.), medical alert system, medical assistance service, police, ambulance, fire department, etc. Also, the smart ring 10 may include one or more PPG sensors for measuring heart rate, heart rate variability, sleep patterns, etc. This information can be used with the movement sensing apparatus to combine movement information (e.g., activity levels, resting levels, falling events, etc.) with biological information to assist in communicating a medical need. The controller device 110 (or a mobile phone itself) may cause the mobile phone to dial a specific phone number (for a family member, friend, care group, non-urgent assistance, doctor, etc.)

In some embodiments, the controller device 110 may send feedback signals to the smart ring 10 to confirm that a specific control command has been received and recognized, or that the control action has been performed as commanded. Alternatively, the controller device 110 may send other feedback signals to indicate that a command was not received, or it was not recognized and therefore the action was not performed.

The set-up processes 140, 150 may be defined as an initiation phase to coordinate or tie together specific user motions with specific control actions or commands. The initiation phase may also enable one or more users to practice the specific motions, which can be captured and stored. The motions can be repeated several times in some cases to get a good range of acceptable motion detection profiles. These profiles could be averaged and stored, or acceptable ranges can be stored as well. In some cases, tapping actions may include Morse code or some other type of code.

The commands may be customized to control different electronic devices or home appliances (e.g., turn on family room lamps, turn on ceiling fan, turn on a television and cable box, close garage door, turn off stove, control IoT device, etc.). The movement profile can be a customized combination of movement characteristics associated with each of the specific commands.

According to additional embodiments, the smart ring 10 may be configured to respond to certain movement profiles for performing certain selection functions. These may be user-customized or preset functions. For example, the user may be configured to enter a sequence of one or more types of motions in order to perform "cancel" commands, "enter" commands, and/or "verify" commands. In this way, the user can cancel an emergency phone call (if accidently dialed) or can verify certain actions that may be outside of normal operation (e.g., "Are you sure you want to turn the volume of these speakers up to 100%?").

Also, in some embodiments, the user can select or customize feedback characteristics of feedback signals. For example, the user may wish to change the frequency or intensity of a vibration pattern used for signaling certain conditions or confirming a command, etc.

Furthermore, the smart ring 10 may include a physical feature (e.g., the width expanded portion 14, the raised feature 16, a form filling piece or insert, a notch, a decorative feature, a logo, etc.) that can be used to help orient the smart ring 10 on the user's finger 19 in a certain orientation to allow the correct three-dimensional motion detection.

In addition to accelerometers, the smart ring 10 may include one or more microphones for receiving voice input and may be configured to respond to certain spoken or natural-language commands. The smart ring 10 may also include one or more speakers for providing feedback tones or beeps, or may be configured to provide spoken language (e.g., a limited vocabulary of common communication). In some embodiments, the smart ring 10 may include one or more cameras for capturing images and image recognition processing functionality to recognize a specific electronic device that is to be controlled, so as to allow the user to point the camera in the direction of a device (e.g., lamp) to control this device. Also, the smart ring 10 may include one or more lights (e.g., LEDs, such as from a PPG sensor, etc.), where the lights may be used to provide feedback (e.g., verification of receiving a command) to the user.

According to still other embodiments, the system for enabling a user to enter control commands may further include two or more rings that can be worn by the user. For example, the user may wear one smart ring 10 on the finger of one hand and another smart ring 10 on the finger of the other hand. The system may therefore not only detect the movement of just one ring, but can also detect the movement of both rings. Also, this scenario also opens up the door for a greater number of combinations of motions from both rings to better characterize control commands and to allow a greater number of possible control commands. Also, the movement of the rings with respect to each other (e.g., movement where the rings are brought close to each other or in contact with each other) can be used for defining movement profiles and corresponding control commands.

As mentioned above, the smart ring 10 can be shared by more than one user, where each user can customize the ring accordingly for different patterns of inputting commands, etc. The smart ring 10 may therefore stores multiple sets of movement profile inputs and feedback outputs. Also, the smart ring 10 may be configured to automatically detect who is currently wearing the ring by certain detectable behavior or other characteristics associated with the current user, such as the user's location (e.g., within a specific room, which access point he or she may be using, movement mannerisms, nearby cell phone, etc.

Conclusion

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A control system comprising:
   a controller device configured to communicate with a smart ring using Bluetooth or Wi-Fi signals and one or more electronic devices, wherein the smart ring is configured to obtain information related to one or more movements of the smart ring while a user is wearing the smart ring, the one or more movements corresponding to a movement profile specifically customized for the user; and
   wherein one or more characteristics of the information is translated so as to obtain one or more control commands associated with the one or more movements; and
   wherein the controller device is further configured to control one or more aspects of the one or more electronic devices based on the one or more control commands, wherein the control of the one or more aspects of the one or more electronic devices involves the smart ring providing haptic feedback in response to the one or more control commands, such that the control is enabled via a verification movement by the smart ring, in response to the haptic feedback, that is defined by the movement profile, is detected, and is_directed to the one or more control commands.

2. The control system of claim 1, wherein the smart ring includes a processing device configured to translate the information so as to obtain the one or more control commands.

3. The control system of claim 1, wherein the smart ring further includes one or more of a vibration device and a beeper device configured to provide audio or tactile feedback to the user.

4. The control system of claim 1, wherein the controller device is a cloud-based controller.

5. The control system of claim 1, wherein the one or more electronic devices include one or more of lights, lamps, ceiling fans, garage doors, televisions, computers, mobile phones, stoves, ovens, microwaves, refrigerators, freezers, dishwashers, timers, HVAC systems, and IoT devices.

6. The control system of claim 5, wherein controlling the one or more aspects of the one or more electronic devices includes one or more of turning on an electronic device, turning off an electronic device, changing a speed of an electronic device, changing a brightness level, changing a channel, dialing a phone number, sending a message, and changing a temperature level.

7. The control system of claim 6, wherein the message or dialing a phone number is associated with an emergency alert.

8. The control system of claim 1, wherein the smart ring is configured to enter a sleep mode and wake up in response to a wake-up movement pattern.

9. The control system of claim 1, further comprising a second smart ring to be worn by the user on another finger, wherein each smart ring is configured to obtain movement information and communicate the movement information or one or more control commands to the controller device.

10. The control system of claim 1, wherein the movements include one or more of tapping a finger on the ring and tapping the ring on something.

11. The control system of claim 1, wherein the translation includes the ability to distinguishing between two or more of tapping a finger on the ring, tapping the ring on something, tapping the ring softly, and tapping the ring firmly.

12. The control system of claim 1, wherein the translation includes the ability to distinguish between two or more of the hand being twisted horizontally, twisted vertically, moved horizontally, moved vertically, moved slowly, and moved rapidly.

13. The control system of claim 1, wherein the translation includes the ability to distinguish between two or more sequences including multiple taps or motions.

14. The control system of claim 1, wherein the user defines the control action corresponding to any sequence of taps or motions.

15. The control system of claim 1, wherein the user defines the taps, motions, or sequences of taps or motions that will correspond to a control action.

16. The control system of claim 1, wherein the controller device is further configured to obtain information related to a sound, wherein one or more characteristics of the sound is translated so as to obtain the one or more control commands.

17. The control system of claim 16, wherein the sound is human speech, and the translation includes the interpretation of human speech.

18. The control system of claim 16. wherein the user trains the translation with a specific set of spoken words of phrases.

19. A smart ring configured to be worn on a finger of a user, the smart ring comprising:
   a movement sensing device configured to obtain movement information related to one or more movements of the smart ring while the user is wearing the smart ring, the one or more movements corresponding to a movement profile specifically customized for the user; and
   a transceiver configured to communicate Bluetooth or Wi-Fi signals with a controller device;
   wherein one or more characteristics of the information is translated so as to obtain one or more control commands associated with the one or more movements; and
   wherein the controller device is configured to control one or more aspects of one or more electronic devices based on the one or more control commands, wherein the control of the one or more aspects of the one or more electronic devices involves the smart ring providing haptic feedback in response to the one or more control commands, such that the control is enabled via a verification movement by the smart ring, in response to the haptic feedback, that is defined by the movement profile, is detected, and is directed to the one or more control commands.

20. The smart ring of claim 19, wherein the one or more electronic devices include one or more lights, lamps, ceiling fans, garage doors, televisions, computers, mobile phones, stoves, ovens, microwaves, refrigerators, freezers, dishwashers, timers, HVAC systems, and IoT devices.

* * * * *